(12) United States Patent
Hirata et al.

(10) Patent No.: US 12,507,389 B2
(45) Date of Patent: Dec. 23, 2025

(54) ELECTRONIC COMPONENT INSTALLATION DEVICE AND ELECTRONIC COMPONENT INSTALLATION METHOD

(71) Applicant: KAWASAKI JUKOGYO KABUSHIKI KAISHA, Kobe (JP)

(72) Inventors: Kazunori Hirata, Kobe (JP); Toshimitsu Kimura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 594 days.

(21) Appl. No.: 18/013,648

(22) PCT Filed: Jun. 29, 2021

(86) PCT No.: PCT/JP2021/024595
§ 371 (c)(1),
(2) Date: Dec. 29, 2022

(87) PCT Pub. No.: WO2022/004734
PCT Pub. Date: Jan. 6, 2022

(65) Prior Publication Data
US 2023/0363129 A1 Nov. 9, 2023

(30) Foreign Application Priority Data
Jun. 29, 2020 (JP) ................. 2020-112044

(51) Int. Cl.
*H05K 13/04* (2006.01)
(52) U.S. Cl.
CPC .................. *H05K 13/04* (2013.01)

(58) Field of Classification Search
CPC .......... H05K 1/141; H05K 3/36; H05K 3/361; H05K 3/366; H05K 3/368; H05K 13/04; H05K 13/0408; H05K 13/041; H05K 13/0411; H05K 13/0813; B25J 9/0087; B25J 9/1679; B25J 9/1682; B25J 9/1687;
(Continued)

(56) References Cited

U.S. PATENT DOCUMENTS

| | | | | |
|---|---|---|---|---|
| 4,610,082 | A | * | 9/1986 | Anderson ............ H01R 43/205 29/830 |
| 9,902,073 | B2 | * | 2/2018 | Osaka .................... B25J 13/088 |

(Continued)

FOREIGN PATENT DOCUMENTS

| | | | | |
|---|---|---|---|---|
| CN | 107683030 | A | * 2/2018 | ............ G06F 1/185 |
| CN | 110253250 | A | 9/2019 | |

(Continued)

OTHER PUBLICATIONS

CN-107683030-A translation from FIT database (Year: 2025).*
CN-111198788-A translation from FIT database (Year: 2025).*

*Primary Examiner* — Jeffrey T Carley
*Assistant Examiner* — Joshua D Anderson
(74) *Attorney, Agent, or Firm* — Oliff PLC

(57) ABSTRACT

A robot includes a first robot arm, a second robot arm that retains a slot at a predetermined position, and a controller that controls the first robot arm. The controller causes the first robot arm to perform installation operation of installing a CPU in the slot. In the installation operation, the first robot arm installs the CPU in the slot retained by the second robot arm.

8 Claims, 16 Drawing Sheets

(58) Field of Classification Search
CPC ... B25J 15/08; B25J 15/0066; Y10T 29/4913; Y10T 29/49139; Y10T 29/53174; G05B 2219/36195; G05B 2219/39129; G05B 2219/40032; G05B 2219/40082; G05B 2219/45064
See application file for complete search history.

(56) References Cited

U.S. PATENT DOCUMENTS

| | | | |
|---|---|---|---|
| 10,399,211 B2 * | 9/2019 | Hara | B25B 5/064 |
| 10,532,461 B2 * | 1/2020 | Kobayashi | B25J 9/1633 |
| 2012/0083920 A1 | 4/2012 | Suyama et al. | |
| 2018/0021950 A1 * | 1/2018 | Shimodaira | B25J 13/02 |
| | | | 318/568.11 |
| 2018/0370043 A1 | 12/2018 | Hashimoto et al. | |
| 2019/0045650 A1 * | 2/2019 | Leigh | H05K 7/1061 |
| 2019/0159372 A1 | 5/2019 | Hashimoto et al. | |
| 2019/0275677 A1 * | 9/2019 | Iwai | B25J 9/1687 |
| 2019/0280405 A1 * | 9/2019 | Iwai | H05K 7/1061 |
| 2019/0329403 A1 * | 10/2019 | Ueda | B25J 15/0052 |
| 2020/0068757 A1 * | 2/2020 | Hughes | H05K 13/0404 |

FOREIGN PATENT DOCUMENTS

| | | | | |
|---|---|---|---|---|
| CN | 111198788 A | * | 5/2020 | G06F 11/22 |
| JP | 2007-211321 A | | 8/2007 | |
| JP | 2012-076805 A | | 4/2012 | |
| JP | 2017-216347 A | | 12/2017 | |
| WO | 2017/085897 A1 | | 5/2017 | |

* cited by examiner

ELECTRONIC COMPONENT INSTALLATION DEVICE AND ELECTRONIC COMPONENT INSTALLATION METHOD

FIELD

The technique disclosed here relates to an electronic component installation device and an electronic component installation method.

BACKGROUND

In a known structure, an electronic component is installed in a socket on a board. For example, in Patent Document 1, a CPU is installed in a CPU socket. The CPU is placed on the CPU socket and, in this state, is fixed by a cover.

CITATION LIST

Patent Document

Patent Document 1: Japanese Patent Application Publication No. 2007-211321

SUMMARY

In an installation structure of an electronic component using a socket, the electronic component is installed in a socket with high positioning accuracy in order to maintain appropriate electrical connection between the electronic component and the socket. Since an electronic component such as a CPU is fragile, installation is carefully handled not to damage the electronic component.

It is conceivable to automate such installation of the electronic component in the socket. However, as described above, the installation structure of the electronic component using the socket has a large number of tasks such as high accuracy in positioning the electronic component and the socket and careful handling of the electronic component.

It is therefore an object of the technique disclosed here to achieve stable installation of an electronic component in a socket with high accuracy.

An electronic component installation device disclosed here is an electronic component installation device that installs an electronic component in a socket through a slot, the socket being disposed on a board, the slot being coupled to the board to be rotatable about a predetermined axis, and the electronic component installation device includes: a first robot arm; a retainer that retains the slot at a predetermined position; and a controller that controls the first robot arm, wherein the controller causes the first robot arm to perform installation operation of installing the electronic component in the slot, and in the installation operation, the first robot arm installs the electronic component in the slot retained by the retainer.

An electronic component installation method disclosed here is an electronic component installation method for installing an electronic component in a socket through a slot, the socket being disposed on a board, the slot being coupled to the board to be rotatable about a predetermined axis, and the electronic component installation method includes the steps of: retaining the slot at a predetermined position by a retainer; and installing the electronic component by a first robot arm in the slot retained by the retainer.

The electronic component installation device enables stable installation of an electronic component in a socket with high accuracy by using a robot arm.

The electronic component installation method enables stable installation of an electronic component in a socket with high accuracy by using a robot arm.

DESCRIPTION OF EMBODIMENTS

Exemplary embodiments will be described in detail hereinafter with reference to the drawings.

First Embodiment

Figure 1:
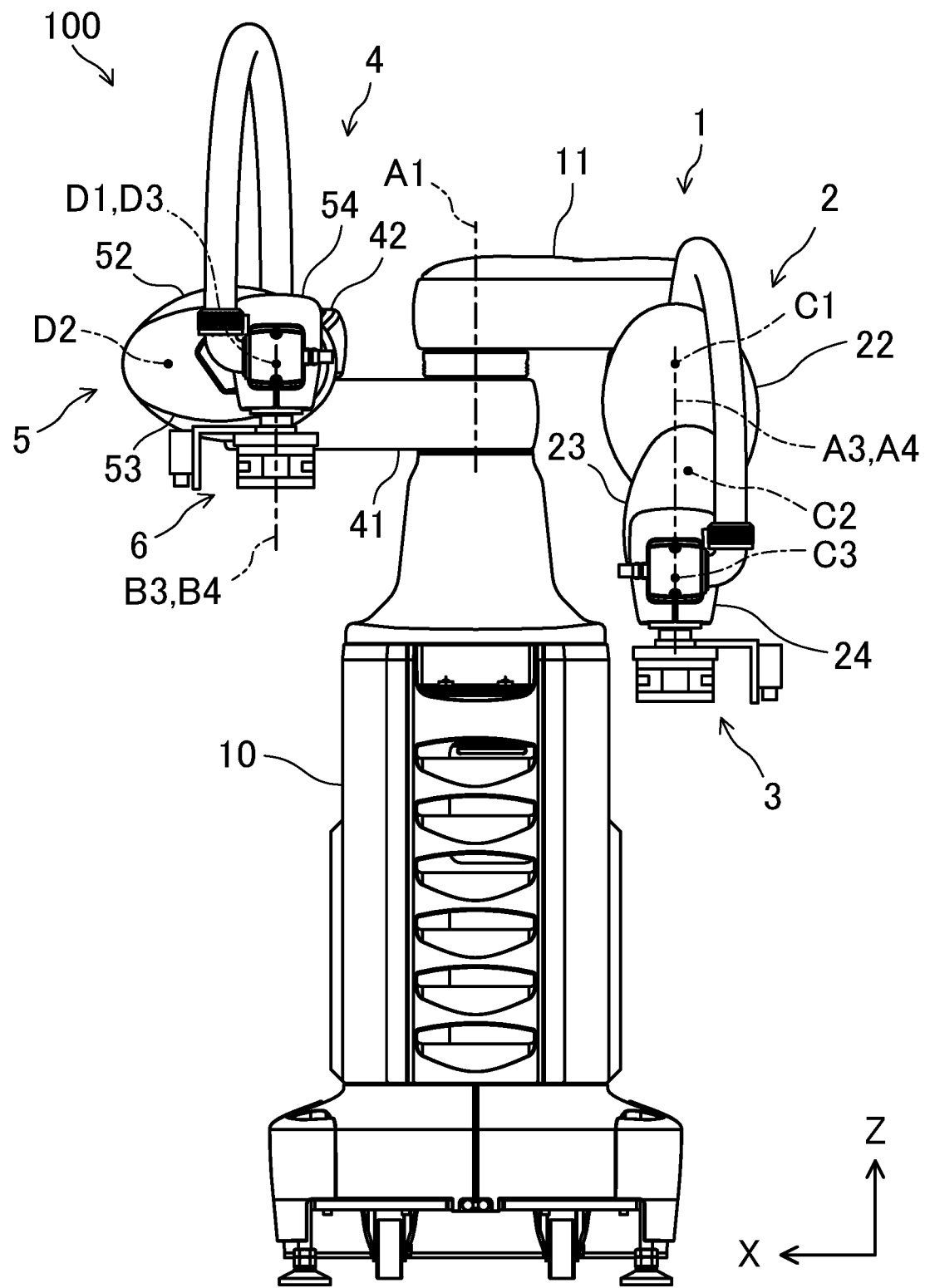
FIG. 1 is a front view of a dual-arm robot.
Figure 2:
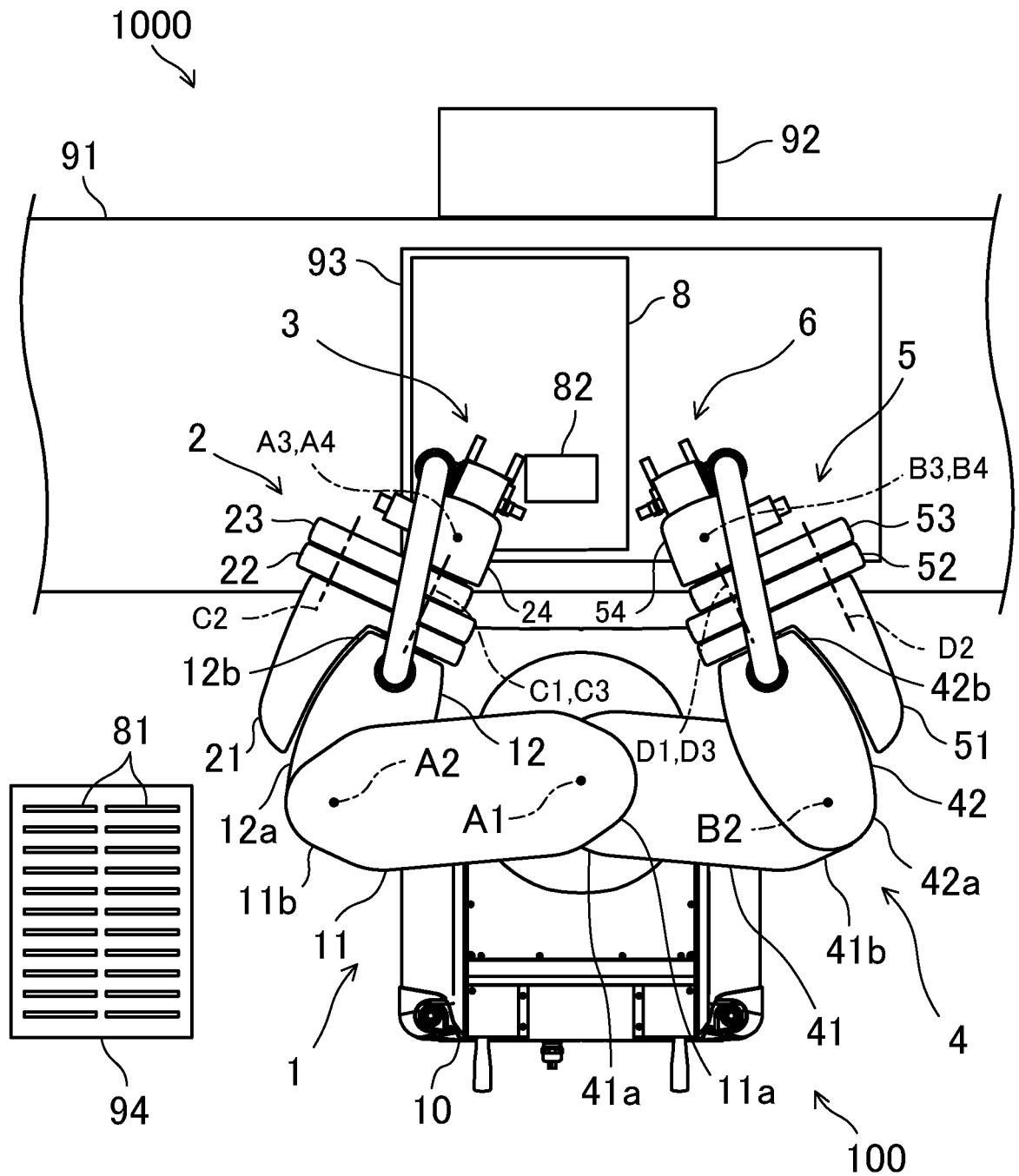
FIG. 2 is a plan view of the dual-arm robot.

A dual-arm robot 100 according to a first embodiment will be described. FIG. 1 is a front view of the dual-arm robot 100. FIG. 2 is a plan view of the dual-arm robot 100. FIG. 2 illustrates a state where the dual-arm robot 100 is incorporated in a work system 1000. The state of a first robot arm 1 and a second robot arm 4 is different between FIG. 1 and FIG. 2.

The dual-arm robot (hereinafter also referred to as a "robot") 100 includes the first robot arm 1, the second robot arm 4, and a controller 7 (see FIG. 8). The robot 100 installs a CPU 81 in a motherboard 8. The robot 100 is an example of an electronic component installation device. The CPU 81 is an example of an electronic component. The motherboard 8 is an example of a board.

<Robot Arm>

The first robot arm 1 and the second robot arm 4 are articulated robot arms. More specifically, the first robot arm 1 and the second robot arm 4 are horizontal articulated robot arms. The first robot arm 1 and the second robot arm 4 perform operation in cooperation. A first end effector 3 is coupled to the first robot arm 1. A second end effector 6 is coupled to the second robot arm 4. The second robot arm 4 is an example of a retainer.

Hereinafter, for convenience of description, x, y, and z axes that are orthogonal to one another are defined. The Z axis extends in top-bottom directions.

The first robot arm 1 includes a first link 11, a second link 12, and a first wrist 2. The second robot arm 4 includes a first link 41, a second link 42, and a second wrist 5. One end of each link in the longitudinal direction will be hereinafter referred to as a first end, and the other end of each link in the longitudinal direction will be hereinafter referred to as a second end.

In the first robot arm 1, a first end 11a of the first link 11 is coupled to a base 10 to be rotatable about a first axis A1 extending along the Z axis. A first end 12a of the second link 12 is coupled to a second end 11b of the first link 11 to be rotatable about a second axis A2 extending along the Z axis. The first end 12a of the second link 12 is disposed above the second end 11b of the first link 11. The first wrist 2 is coupled to the second link 12.

In the second robot arm 4, a first end 41a of the first link 41 is coupled to the base 10 to be rotatable about the first axis A1. That is, the first link 41 is coupled to the base 10 coaxially with the first link 11. The first end 41a of the first link 41 is disposed above the first end 11a of the first link 11. A first end 42a of the second link 42 is coupled to a second end 41b of the first link 41 to be rotatable about a second axis B2 extending along the Z axis. The first end 42a of the second link 42 is disposed below the second end 41b of the first link 41. The second wrist 5 is coupled to the second link 42.

Figure 8:
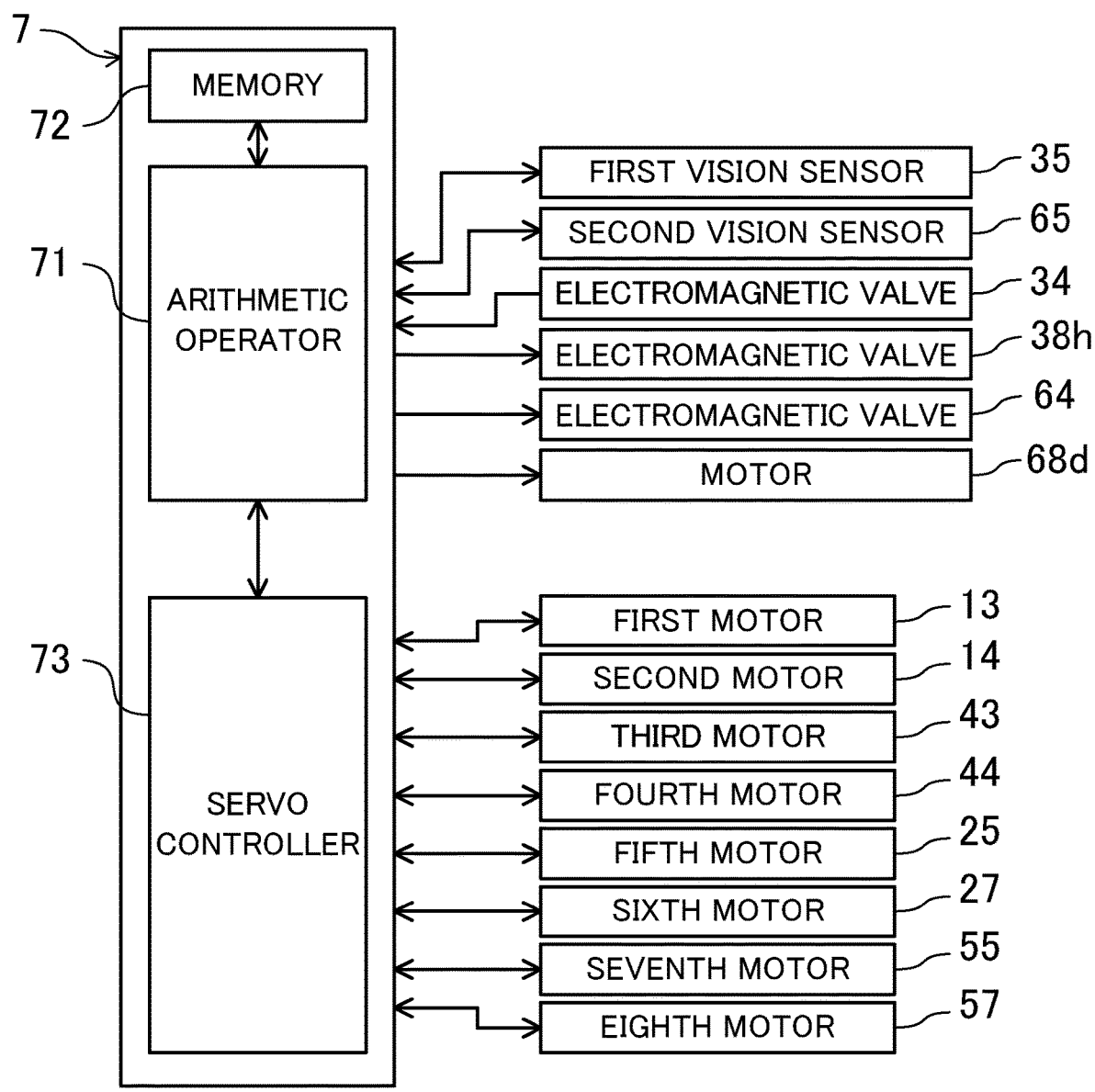
FIG. 8 is a block diagram of a controller.

The robot 100 includes a first motor 13 that drives the first link 11, a second motor 14 that drives the second link 12, a third motor 43 that drives the first link 41, and a fourth motor 44 that drives the second link 42 (see FIG. 8). For example, the first motor 13, the second motor 14, the third motor 43, and the fourth motor 44 are servo motors. Each servo motor includes an encoder that detects a rotation position of the motor. Although not shown, the robot 100 includes a transfer mechanism that transfers a driving force of each motor to the corresponding link. The transfer mechanism is a combination of a gear train, pulleys, and a belt, for example.

The first end effector 3 is coupled to a distal end of the first robot arm 1, specifically, the first wrist 2. The first wrist 2 moves the first end effector 3 linearly along a third axis A3 extending along the Z axis and rotates the first end effector 3 about a fourth axis A4 extending along the Z axis. In this example, the third axis A3 and the fourth axis A4 are coaxial.

The second end effector 6 is coupled to a distal end of the second robot arm 4, specifically, the second wrist 5. The second wrist 5 moves the second end effector 6 linearly along a third axis B3 extending along the Z axis and rotates the second end effector 6 about a fourth axis B4 extending along the Z axis. In this example, the third axis B3 and the fourth axis B4 are coaxial.

<First Wrist>

The first wrist 2 includes a first junction 21, a first link 22, a second link 23, and a second junction 24. The first junction 21 is fixed to a second end 12b of the second link 12. The first link 22 is coupled to the first junction 21 to be rotatable about a first interlocking shaft C1 extending parallel to an XY plane. The second link 23 is coupled to the first link 22 to be rotatable about a second interlocking shaft C2 parallel to the first interlocking shaft C1. The second junction 24 is coupled to the second link 23 to be rotatable about a third interlocking shaft C3 parallel to the first interlocking shaft C1.

The first junction 21 includes a fifth motor 25 (see FIG. 8). The first wrist 2 includes a transfer mechanism (not shown) that transfers a driving force of the fifth motor 25 to each of the first link 22, the second link 23, and the second junction 24. The transfer mechanism is, for example, a gear train. The first link 22, the second link 23, and the second junction 24 operate in conjunction with one another by a driving force of one fifth motor 25. The transfer mechanism rotates the first link 22, the second link 23, and the second junction 24 such that rotation angles of the first link 22, the second link 23, and the second junction 24 maintain a constant relationship. Specifically, the first link 22, the second link 23, and the second junction 24 rotate in conjunction with one another such that the second junction 24 moves only in the third axis A3 extending along the Z axis while maintaining a posture of the second junction 24. That is, the first wrist 2 substantially moves the second junction 24 linearly along the third axis A3.

The first end effector 3 is coupled to the second junction 24 to be rotatable about the fourth axis A4 extending along the Z axis. The second junction 24 includes a sixth motor 27 (see FIG. 8) and a transfer mechanism (not shown) that transfers a driving force of the sixth motor 27 to the first end effector 3. The first end effector 3 is rotated about the fourth axis A4 by the sixth motor 27.

<Second Wrist>

The second wrist 5 has substantially the same structure as that of the first wrist 2. The second wrist 5 includes a first junction 51, a first link 52, a second link 53, and a second junction 54.

The first junction 51 is fixed to a second end 42b of the second link 42. The first link 52 is coupled to the first junction 51 to be rotatable about a first interlocking shaft D1 extending parallel to the XY plane. The second link 53 is coupled to the first link 52 to be rotatable about a second interlocking shaft D2 parallel to the first interlocking shaft D1. The second junction 54 is coupled to the second link 53 to be rotatable about a third interlocking shaft D3 parallel to the first interlocking shaft D1.

The first junction 51 includes a seventh motor 55 (see FIG. 8). The second wrist 5 includes a transfer mechanism (not shown) that transfers a driving force of the seventh motor 55 to each of the first link 52, the second link 53, and the second junction 54. The first link 52, the second link 53, and the second junction 54 operate in conjunction with one another by a driving force of one seventh motor 55. The transfer mechanism rotates the first link 52, the second link 53, and the second junction 54 such that rotation angles of the first link 52, the second link 53, and the second junction 54 maintain a constant relationship. Specifically, the first link 52, the second link 53, and the second junction 54 rotate in conjunction with one another such that the second junction 54 moves only in the third axis B3 extending along the Z axis while maintaining the posture. That is, the second wrist 5 substantially moves the second junction 54 linearly along the third axis B3.

The second end effector 6 is coupled to the second junction 54 to be rotatable about the fourth axis B4 extending along the Z axis. The second junction 54 includes an eighth motor 57 (see FIG. 8) and a transfer mechanism (not shown) that transfers a driving force of the eighth motor 57 to the second end effector 6. The second end effector 6 is rotated about the fourth axis B4 by the eighth motor 57.

<First End Effector>

Figure 3:
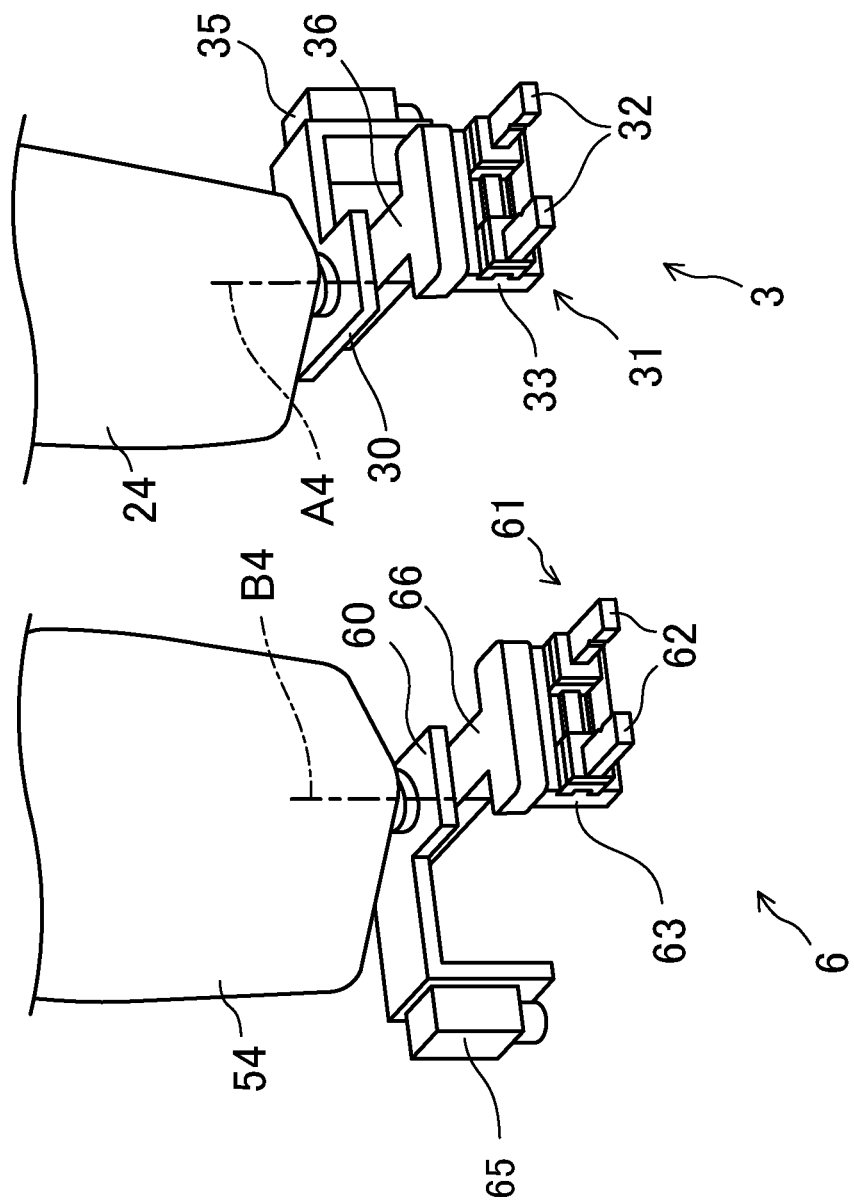
FIG. 3 is a perspective view of a first end effector and a second end effector.

FIG. 3 is a perspective view of the first end effector 3 and the second end effector 6. The first end effector 3 includes a base 30 rotatably coupled to the second junction 24 of the first wrist 2, a first hand 31 disposed in the base 30, and a first vision sensor 35.

The base 30 expands in a plane orthogonal to the fourth axis A4.

The first hand 31 is attached to the base 30 with an attachment plate 36 interposed therebetween. The attachment plate 36 extends from the base 30 in the radial direction about the fourth axis A4. The first hand 31 is disposed at the distal end of the attachment plate 36.

The first hand 31 includes a pair of fingers 32 and an actuator (not shown) that drives the pair of fingers 32. The pair of fingers 32 is parallel to each other and extends horizontally. The pair of fingers 32 is supported by a guide 33 to be slidable horizontally. The pair of fingers 32 is guided by the guide 33 such that the pair of fingers 32 is separated from each other and approaches each other while being kept parallel to each other.

The actuator is, for example, an air cylinder. The actuator is connected to an air compressor (not shown) through a pipe and an electromagnetic valve 34 (see FIG. 8). The air compressor drives the actuator by pumping air. The direction in which the actuator moves the pair of fingers 32 is switched by the electromagnetic valve 34. That is, the electromagnetic valve 34 switches the direction of the pair of fingers 32 between the direction in which the pair of fingers 32 is separated from each other and the direction in which the pair of fingers 32 approaches each other.

The first vision sensor 35 is disposed in the base 30. The first vision sensor 35 is oriented downward in the Z-axis direction, and captures an image of an object below the first vision sensor 35.

The thus-configured first end effector 3 holds an extension hand by the first hand 31. The first end effector 3 changes extension hands to be held by the first hand 31 in accordance with a work content. In this manner, the first end effector 3 can be used for various work contents.

<Second End Effector>

The second end effector 6 includes a base 60 rotatably coupled to the second junction 54 of the second wrist 5, a second hand 61 disposed in the base 60, and a second vision sensor 65.

The base 60 expands in a plane orthogonal to the fourth axis B4.

The second hand 61 is attached to the base 60 with an attachment plate 66 interposed therebetween. The attachment plate 66 extends from the base 60 in the radial direction about the fourth axis B4. The second hand 61 is disposed at the distal end of the attachment plate 66.

The second hand 61 includes a pair of fingers 62 and an actuator (not shown) that drives the pair of fingers 62. The pair of fingers 62 is parallel to each other and extends horizontally. The pair of fingers 62 is supported by a guide 63 to be slidable horizontally. The pair of fingers 62 is guided by the guide 63 such that the pair of fingers 62 is separated from each other and approaches each other while being kept parallel to each other.

The actuator is, for example, an air cylinder. The actuator is connected to an air compressor (not shown) through a pipe and an electromagnetic valve 64 (see FIG. 8). The air compressor drives the actuator by pumping air. The direction in which the actuator moves the pair of fingers 62 is switched by the electromagnetic valve 64. That is, the electromagnetic valve 64 switches the direction of the pair of fingers 62 between the direction in which the pair of fingers 62 is separated from each other and the direction in which the pair of fingers 62 approaches each other.

The second vision sensor 65 is disposed in the base 60. The second vision sensor 65 is oriented downward in the Z-axis direction, and captures an image of an object below the second vision sensor 65.

The thus-configured second end effector 6 holds an extension hand by the second hand 61. The second end effector 6 changes extension hands to be held by the second hand 61 in accordance with a work content. In this manner, the second end effector 6 can be used for various work contents.

<Extension Hand>

Figure 4:
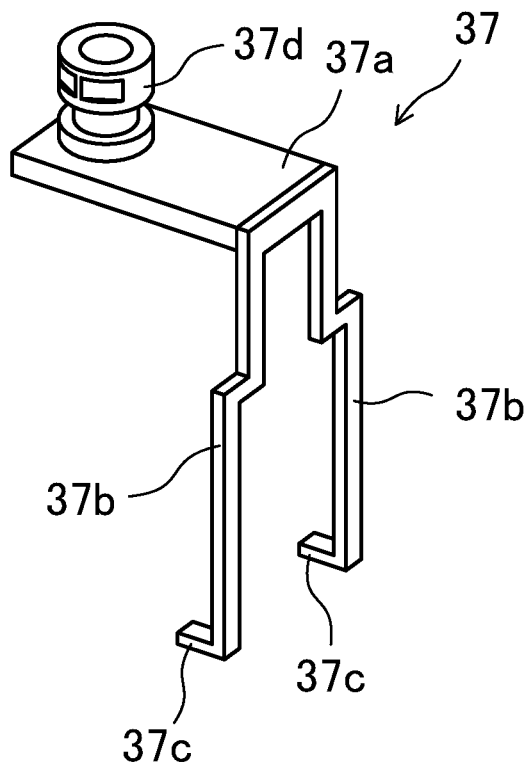
FIG. 4 is a perspective view of a first extension hand.
Figure 5:
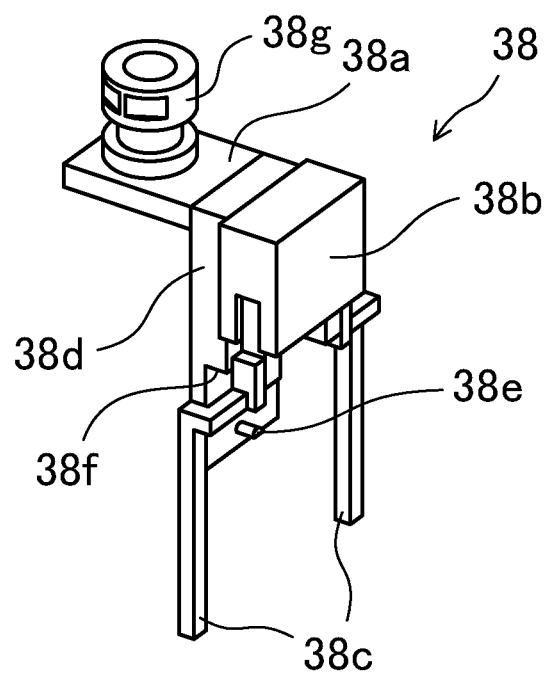
FIG. 5 is a perspective view of a second extension hand.
Figure 6:
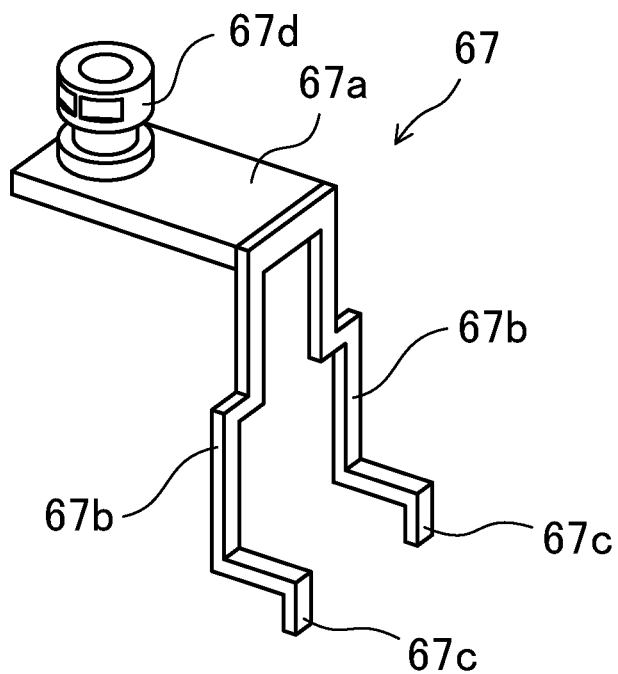
FIG. 6 is a perspective view of a third extension hand.
Figure 7:
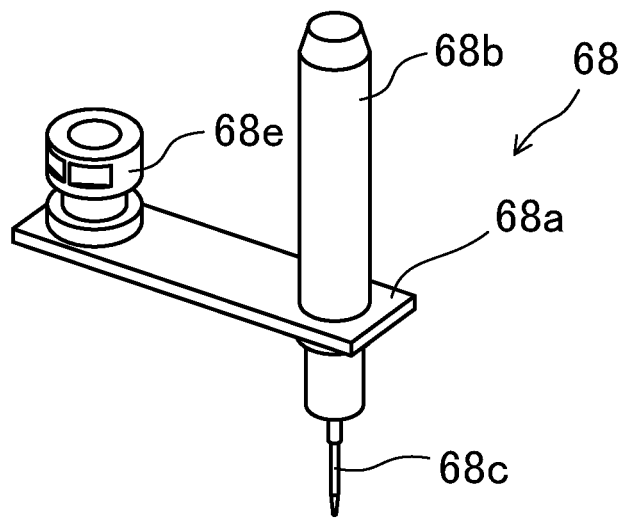
FIG. 7 is a perspective view of a fourth extension hand.

Next, extension hands held by the first end effector 3 and the second end effector 6 will be described. FIG. 4 is a perspective view of a first extension hand 37. FIG. 5 is a perspective view of a second extension hand 38. FIG. 6 is a perspective view of a third extension hand 67. FIG. 7 is a perspective view of a fourth extension hand 68.

The first end effector 3 selectively holds the first extension hand 37 and the second extension hand 38. In the first end effector 3, the direction in which the attachment plate 36 extends (i.e., the direction in which the first hand 31 is eccentric from the fourth axis A4) is defined as a front-rear direction, and a horizontal direction orthogonal to the front-rear direction is defined as a lateral direction.

The first extension hand 37 includes a base 37a, a pair of fingers 37b disposed in the base 37a, and a cylindrical grip 37d disposed in the base 37a. The pair of fingers 37b is disposed side by side in the lateral direction and extends substantially in the top-bottom direction. A nail 37c extending in the front-rear direction is disposed at the distal end of each finger 37b. The first hand 31 holds the grip 37d.

The second extension hand 38 is a single-chuck hand. The second extension hand 38 includes a base 38a, a guide 38b disposed in the base 38a, a pair of fingers 38c supported by the guide 38b, an actuator that drives the pair of fingers 38c, a plate 38d disposed in the base 38a, a pin 38e disposed in the plate 38d, and a cylindrical grip 38g disposed in the base 38a.

The base 38a, the plate 38d, and the guide 38b are arranged in the front-rear direction. The plate 38d is disposed between the base 38a and the guide 38b. The plate 38d expands downward from the base 38a. A normal direction to the plate 38d extends in the front-rear direction. A lower portion of the plate 38d is thinner than an upper portion of the plate 38d. A step 38f is disposed on a surface of the plate 38d facing the guide 38b. The pin 38e extends toward the guide 38b in the front-rear direction in a lower portion of the plate 38d. The pin 38e has a substantially semicircular cross section.

The pair of fingers 38c is disposed side by side in the lateral direction and extends substantially downward from the guide 38b. The guide 38b supports the pair of fingers 38c such that the pair of fingers 38c is separated from each other or approaches each other in the lateral direction. The actuator is, for example, an air cylinder. The actuator is connected to an air compressor (not shown) through a pipe and an electromagnetic valve 38h (see FIG. 8). The direction in which the actuator moves the pair of fingers 38c is switched by the electromagnetic valve 38h. That is, the electromagnetic valve 38h switches the direction of the pair of fingers 38c between the direction in which the pair of fingers 38c is separated from each other and the direction in which the pair of fingers 38c approaches each other. The first hand 31 holds the grip 38g.

The second end effector 6 selectively holds the third extension hand 67 and the fourth extension hand 68. In the second end effector 6, the direction in which the attachment plate 66 extends (i.e., the direction in which the second hand 61 is eccentric from the fourth axis B4) is defined as the front-rear direction, and a horizontal direction orthogonal to the front-rear direction is defined as the lateral direction.

The third extension hand 67 includes a base 67a, a pair of fingers 67b disposed in the base 67a, and a cylindrical grip 67d disposed in the base 67a. The pair of fingers 67b is disposed side by side in the lateral direction and extends substantially in the top-bottom direction. The distal end of each finger 67b bends in the front-rear direction. A nail 67c extending downward is disposed at the distal end of each finger 67b. The second hand 61 holds the grip 67d.

The fourth extension hand 68 is a hand of a rotary tool type. The fourth extension hand 68 includes a base 68a, a tool body 68b disposed in the base 68a, a bit 68c disposed in the tool body 68b, a motor 68d (see FIG. 8) that is incorporated in the tool body 68b and rotatably drives the bit 68c, and a cylindrical grip 68e disposed in the base 68a. The second hand 61 holds the grip 68e.

<Controller>

FIG. 8 is a block diagram of the controller 7. The controller 7 includes an arithmetic operator 71, a memory 72, and a servo controller 73. The arithmetic operator 71 is a processor such as a CPU. The memory 72 is, for example, a ROM or a RAM. The servo controller 73 is a processor such as a CPU.

The memory 72 stores a basic program as a robot controller and information such as various types of data. The arithmetic operator 71 reads and executes software such as a basic program stored in the memory 72 to thereby control operations of the robot 100.

The arithmetic operator 71 outputs control signals to the first vision sensor 35 and the second vision sensor 65. Output signals from the first vision sensor 35 and the second vision sensor 65 are input to the arithmetic operator 71. The arithmetic operator 71 causes the first vision sensor 35 and the second vision sensor 65 to capture images of an object, and based on results of the image capturing, computes a position and a shape of the object. The arithmetic operator 71 outputs a control signal to the motor 68d, the electromagnetic valve 34, etc. For example, the arithmetic operator 71 controls separation and approach of the pair of fingers 32 of the first hand 31. The arithmetic operator 71 also generates a control command of the robot 100, and outputs the control command to the servo controller 73. For example, the arithmetic operator 71 controls the first robot arm 1 and the second robot arm 4 through the servo controller 73.

The servo controller 73 supplies a driving current to each of the first motor 13, the second motor 14, the third motor 43, the fourth motor 44, the fifth motor 25, the sixth motor 27, the seventh motor 55, and an eighth motor 57, and receives detection signals of the encoders from these motors. For example, the servo controller 73 outputs a driving current to the corresponding motor based on a control command from the arithmetic operator 71. At this time, the servo controller 73 controls the driving current based on a detection signal of each encoder.

<Operation of Robot>

Then, the work system 1000 in which the robot 100 is incorporated will be described.

In the work system 1000, a belt conveyor 91 is disposed forward of the robot 100 as illustrated in FIG. 2. A tool storage area 92 is disposed near the belt conveyor 91. Although not shown in FIG. 2, in the tool storage area 92, the first extension hand 37, the second extension hand 38, the third extension hand 67, and the fourth extension hand 68 are placed.

The belt conveyor 91 conveys a tray 93 on which the motherboard 8 is placed. The belt conveyor 91 includes a stopper (not shown) that stops the tray 93 before the robot 100. The robot 100 installs a CPU 81 in the motherboard 8 in the tray 93 stopped by the stopper. A CPU storage area 94 for housing CPUs 81 before installation is disposed at a side of the robot 100.

Figure 9:
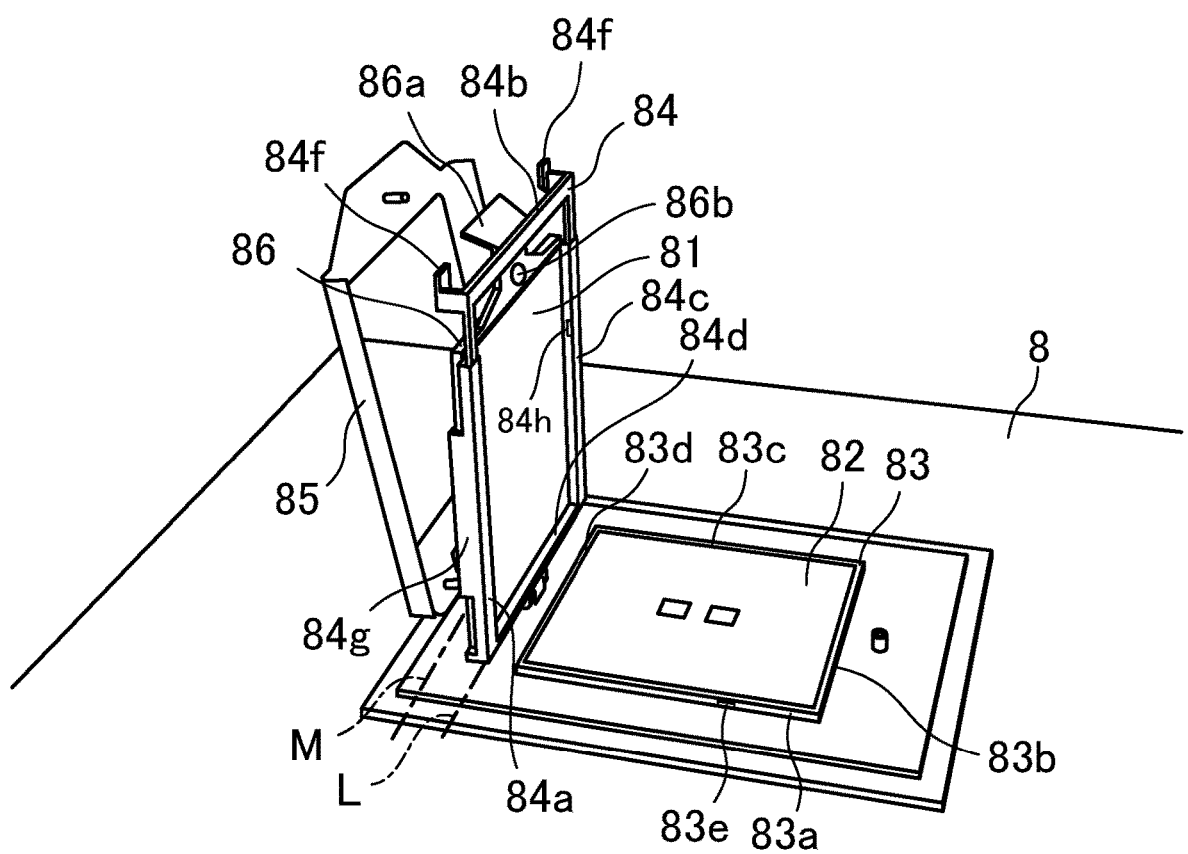
FIG. 9 is a perspective view of a CPU socket in a state where a slot and a fixed frame are in upright states.

FIG. 9 is a perspective view of a CPU socket 82 in a state where a slot 84 and a fixed frame 85 are in upright states.

The motherboard 8 includes the CPU socket 82, the slot 84, and the fixed frame 85.

On the CPU socket 82, contact pins (not shown) are arranged. The contact pins are arranged in association with the CPU 81. The CPU socket 82 includes a base frame 83. The base frame 83 surrounds the contact pins of the CPU socket 82. The CPU 81 is to be placed on the base frame 83. The CPU 81 placed on the base frame 83 contacts the contact pins and is electrically connected to the contact pints. The CPU socket 82 is an example of a socket.

The base frame 83 has a substantially rectangular shape in plan view. Specifically, the base frame 83 includes a pair of approximately parallel long sides 83a and 83c and a pair of approximately parallel short sides 83b and 83d. Each of the long sides 83a and 83c has a first engagement 83e with which the slot 84 is engaged. The first engagement 83e is recessed.

The slot 84 is coupled to the motherboard 8 to be rotatable about a predetermined axis L. The slot 84 has a substantially rectangular frame shape. Specifically, the slot 84 includes a pair of approximately parallel long sides 84a and 84c and a pair of approximately parallel short sides 84b and 84d. The short side 84d is coupled to the motherboard 8 to be rotatable about the axis L. The short side 84d is parallel to the axis L.

The slot 84 is made of a metal streak and partially covered with resin. For example, most parts of the long sides 84a and 84c are covered with resin, and ends of the long sides 84a and 84c toward the short side 84b are made only of metal streaks. The short side 84b is entirely made of a metal streak.

Each of the long sides 84a and 84c has a guide 84g in which the CPU 81 is slidably inserted. The guide 84g is located in each resin portion of the long sides 84a and 84c. The guide 84g has a groove shape that is open inward of the slot 84 (i.e., inward of a rectangle shaped by the slot 84).

The CPU 81 is inserted in the guides 84g and 84g of the long sides 84a and 84c from the short side 84b. Specifically, the CPU 81 is equipped with a carrier frame 86. The carrier frame 86 has a substantially rectangular frame shape. The carrier frame 86 covers the periphery of the CPU 81. The carrier frame 86 is inserted in the guide 84g. That is, the CPU 81 is inserted in the guide 84g with the carrier frame 86 interposed therebetween. The CPU 81 is inserted in the guides 84g of the long sides 84a and 84c to be thereby installed in the slot 84. The CPU 81 is pulled out from the guides 84g of the long sides 84a and 84c to be thereby detached from the slot 84.

The carrier frame 86 includes a projection 86a projecting outward (i.e., outward of a rectangle shaped by the carrier frame 86). In a state where the carrier frame 86 is installed in the slot 84, the projection 86a projects outward from the slot 84 in the short side 84b of the slot 84. The projection 86a has a through hole 86b.

The slot 84 is rotationally movable about the axis L between a fallen state where the slot is fallen on the motherboard 8 and an upright state where the slot stands on the motherboard 8. In the fallen state, the slot 84 is approximately parallel to the motherboard 8. In the upright state, the slot 84 has rotated to an installation/detachment position at which the CPU 81 is installed or detached. The installation/detachment position is, for example, a position in which the slot 84 rises at approximately 90 degrees from the fallen state. The upright state is, for example, a state where the slot 84 rises at approximately 90 degrees from the fallen state. The slot 84 is further rotationally movable over the installation/detachment position from the fallen state. The slot 84 is biased by a helical torsion spring (not shown) in a direction in which the slot 84 shifts from the fallen state to the upright state. Specifically, in a case where no external force except for the gravity is exerted on the slot 84, the slot 84 is in a natural state between the fallen state and the upright state by the helical torsion spring. Specifically, the natural state is a state where the slot 84 rises from the fallen state to an angle less than 90 degrees. When the slot 84 becomes the fallen state with the CPU 81 installed, the CPU 81 is placed on the CPU socket 82. Specifically, the CPU 81 is placed on the base frame 83, and is electrically connected to the contact pins of the CPU socket 82. Since a position at which the slot 84 places the CPU 81 on the CPU socket 82 is uniform, the CPU 81 can be placed on the CPU socket 82 with high positioning accuracy.

The slot 84 is configured to be locked to the motherboard 8 in the fallen state. Specifically, each of the long sides 84a and 84c has a second engagement 84h. The second engagement 84h is a projection. The second engagement 84h is located on each resin portion of the long sides 84a and 84c. When the slot 84 becomes the fallen state, the second engagement 84h is engaged with the first engagement 83e of the base frame 83. The engagement between the second engagement 84h and the first engagement 83e causes the slot 84 to be locked to the motherboard 8 in the fallen state. Accordingly, the CPU 81 is retained while being placed on the CPU socket 82.

The long sides 84a and 84c respectively have projections 84f and 84f projecting from the short side 84b.

The fixed frame 85 has a substantially rectangular frame shape. The fixed frame 85 is coupled to the motherboard 8 to be rotatable about a predetermined axis M. In this example, the axis M is parallel to the axis L. The fixed frame 85 is rotationally movable about the axis M between a fallen state where the fixed frame 85 is fallen on the motherboard 8 and an upright state where the fixed frame 85 stands on the motherboard 8. In the fallen state, the fixed frame 85 is approximately parallel to the motherboard 8. The upright state is a state where the fixed frame 85 rises from the fallen state across approximately 90 degrees. The fixed frame 85 is further rotationally movable over the upright state from the fallen state. The fixed frame 85 is biased by a helical torsion spring (not shown) from the fallen state to the upright state. Specifically, in a case where no external force except for the gravity is exerted on the fixed frame 85, the fixed frame 85 is in the upright state as a natural state by the helical torsion spring.

In the rotation direction of the fixed frame 85, the slot 84 is located between the fixed frame 85 and the motherboard 8. That is, when the fixed frame 85 is in the fallen state, the fixed frame 85 covers the slot 84 also in the fallen state. The fixed frame 85 in the fallen state is fixed to the motherboard 8 with screws. In this example, the fixed frame 85 is fixed to the motherboard 8 at three points with screws. Thus, the fixed frame 85 pushes the slot 84 against the motherboard 8, and the CPU 81 is pushed against the base frame 83 accordingly. This ensures electrical connection between the CPU 81 and the contact pins.

At the time when the motherboard 8 is conveyed to the robot 100, the CPU 81 is not installed in the motherboard 8. The slot 84 is locked to the motherboard 8 in the fallen state. Similarly, the fixed frame 85 is also in the fallen state, and is fixed to the motherboard 8 with screws. At this time, the first protection cover 87 is installed in the slot 84 (see, for example, FIGS. 10 and 11). The first protection cover 87 is disposed to protect the CPU socket 82.

The first protection cover 87 is inserted in the guides 84g in a manner similar to the CPU 81 to be thereby installed in the slot 84. The first protection cover 87 includes projections 87a projecting outward. In the state where the first protection cover 87 is installed in the slot 84, the projections 87a project outward from the slot 84 in the short sides 84b of the slot 84. The projections 87a have through holes 87b. In the fallen state of the slot 84, the first protection cover 87 covers the entire surface of the CPU socket 82.

Then, installation of the CPU 81 by the robot 100 will now be described.

When the tray 93 on which the motherboard 8 is placed is conveyed to the front of the robot 100 by the belt conveyor 91, the tray 93 is stopped by the stopper of the belt conveyor 91.

When the tray 93 is stopped, the controller 7 causes the first vision sensor 35 and the second vision sensor 65 to capture images of the motherboard 8 and the CPU socket 82. Specifically, the first robot arm 1 and the second robot arm 4 move the first vision sensor 35 and the second vision sensor 65 such that the first vision sensor 35 and the second vision sensor 65 are located above the motherboard 8 and the CPU socket 82. The first vision sensor 35 and the second vision sensor 65 capture images of the motherboard 8 and a periphery of the CPU socket 82, and the controller 7 acquires the positions of the motherboard 8 and the CPU socket 82. Based on the acquired positions of the motherboard 8 and the CPU socket 82, the controller 7 causes the first robot arm 1 and other members to execute the following operation.

Figure 10:
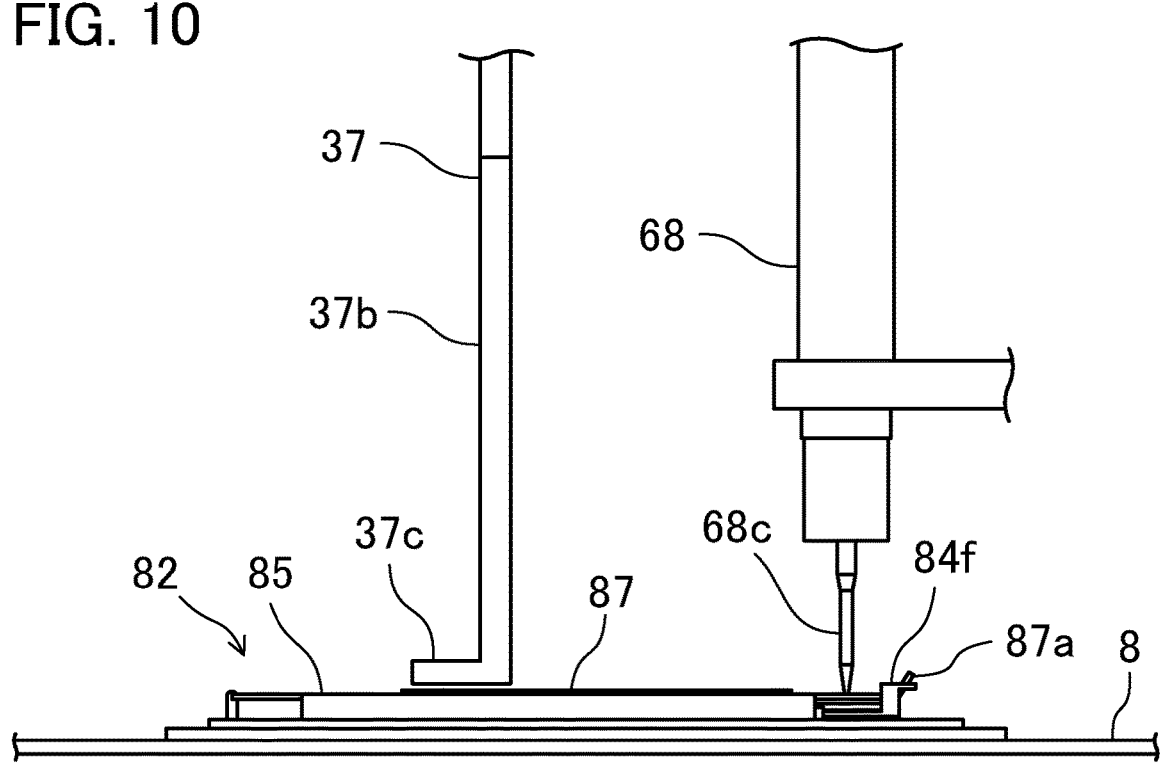
FIG. 10 is a side view of the motherboard mainly including a CPU socket in fixture releasing operation.

First, the controller 7 causes the second robot arm 4 to execute fixture releasing operation of releasing screw fixture of the fixed frame 85. FIG. 10 is a side view of the motherboard 8 mainly including the CPU socket 82 in the fixture releasing operation. The side view of the motherboard 8 used in description of the first embodiment is a side view of the motherboard 8 seen from the robot 100.

In the fixture releasing operation, the second end effector 6 uses the fourth extension hand 68. The second robot arm 4 moves the second end effector 6 such that the tip of the bit 68c of the fourth extension hand 68 is fitted in a groove in a screw head for fixing the fixed frame 85. When the tip of the bit 68c is fitted in the screw groove, the fourth extension hand 68 loosens the screw to release screw fixture. The controller 7 causes this operation to be performed a number of times equal to the number of screws fixing the fixed frame 85.

At this time, the controller 7 causes the first robot arm 1 to perform receiving operation of receiving the fixed frame 85 whose fixture is released. In the receiving operation, the first end effector 3 uses the first extension hand 37. The first robot arm 1 moves the nails 37c of the first extension hand 37 above the fixed frame 85 at a final phase of the fixture releasing operation. When fixture of the fixed frame 85 is released, the fixed frame 85 rotationally moves to the upright state by the helical torsion spring. At this time, the fixed frame 85 is brought into contact with the nails 37c of the first extension hand 37 so that abrupt bouncing of the fixed frame 85 is thereby prevented. In this manner, the fixed frame 85 is supported by the first extension hand 37 in a state where fixture to the motherboard 8 is released and the fixed frame 85 slightly rises from the fallen state.

Then, the controller 7 causes the first robot arm 1 to perform frame opening operation of raising the fixed frame 85. In the frame opening operation, the first end effector 3 uses the first extension hand 37. That is, the first robot arm 1 performs the frame opening operation by still using the first extension hand 37 subsequent to the receiving operation. In the receiving operation, the first extension hand 37 retains the rising fixed frame 85 by an elastic force of the helical torsion spring. In the frame opening operation, the first robot arm 1 moves the first extension hand 37 such that the fixed frame 85 rises slowly by an elastic force of the helical torsion spring. When the fixed frame 85 rises to the upright state, that is, to the natural state, rotational movement of the fixed frame 85 is naturally stopped.

Figure 11:
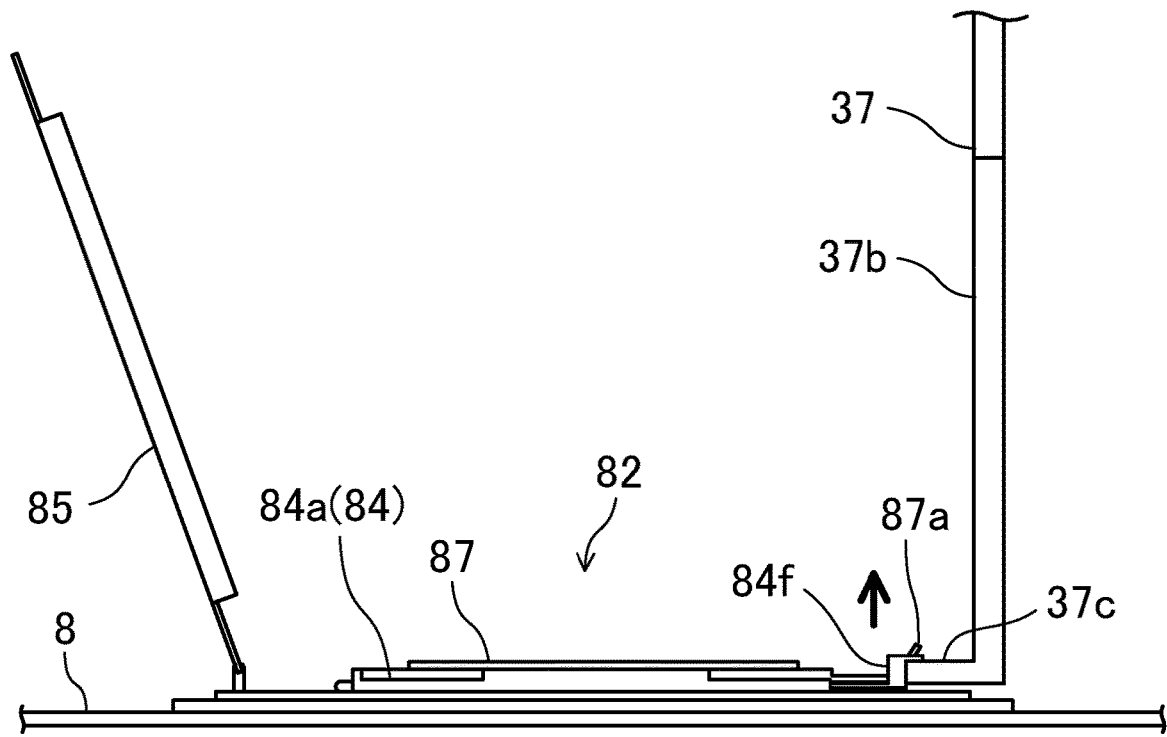
FIG. 11 is a side view of the motherboard mainly including the CPU socket in starting unlocking operation.
Figure 12:
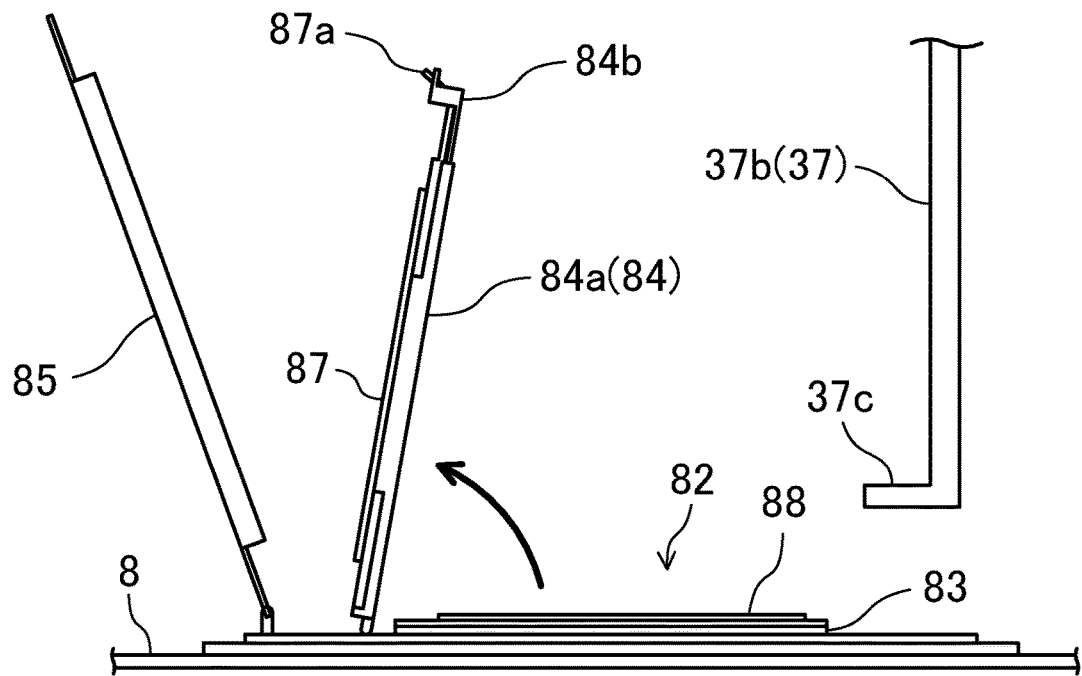
FIG. 12 is a side view of the motherboard mainly including the CPU socket in finishing the unlocking operation.

Thereafter, the controller 7 causes the first robot arm 1 to perform unlocking operation of unlocking the slot 84 in the fallen state. FIG. 11 is a side view of the motherboard 8 mainly including the CPU socket 82 at start of the unlocking operation. FIG. 12 is a side view of the motherboard 8 mainly including the CPU socket 82 at completion of the unlocking operation.

In the unlocking operation, the first end effector 3 uses the first extension hand 37, as illustrated in FIG. 11. That is, the first robot arm 1 performs the unlocking operation by still using the first extension hand 37 subsequent to the frame opening operation. The first robot arm 1 moves the first end effector 3 such that the nails 37c and 37c of the pair of fingers 37b of the first extension hand 37 are located below the two projections 84f and 84f of the slot 84 in the fallen state. The first robot arm 1 lifts the first extension hand 37. Accordingly, the nails 37c and 37c push the projections 84f and 84f upward. The streaks such as the long sides 84a and 84c of the slot 84 are elastically deformed to some degree so that the second engagements 84h and 84h of the slot 84 are separated from the first engagements 83e and 83e of the base frame 83. In this manner, the slot 84 is unlocked. Once the slot 84 is unlocked, the slot 84 rises from the fallen state to the natural state by an elastic force of the helical torsion spring, as illustrated in FIG. 12. This unlocking operation is an example of releasing operation.

Figure 13:
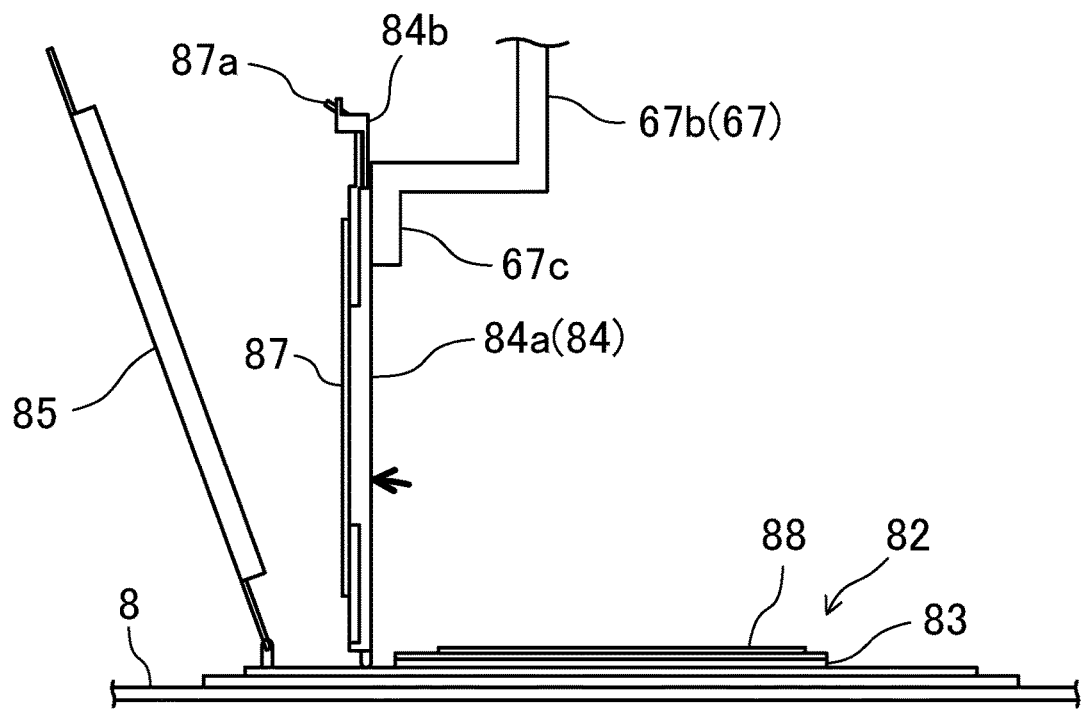
FIG. 13 is a side view of the motherboard mainly including the CPU socket in retention operation.

Subsequently, the controller 7 causes the second robot arm 4 to perform retention operation of retaining the slot 84 in the upright state. FIG. 13 is a side view of the motherboard 8 mainly including the CPU socket 82 in the retention operation.

In the retention operation, the second end effector 6 uses the third extension hand 67. The second robot arm 4 moves the second end effector 6 such that the nails 67c and 67c of the pair of fingers 67b of the third extension hand 67 cause the slot 84 in the natural state to further rise against an elastic force of a helical torsion spring. When the slot 84 rotates to the installation/detachment position, that is, to become the upright state, the second robot arm 4 stops movement of the second end effector 6 and maintains this state. That is, the second robot arm 4 retains the slot 84 in the upright state. The retention operation corresponds to the step of retaining the slot at a predetermined position by the retainer.

Figure 14:
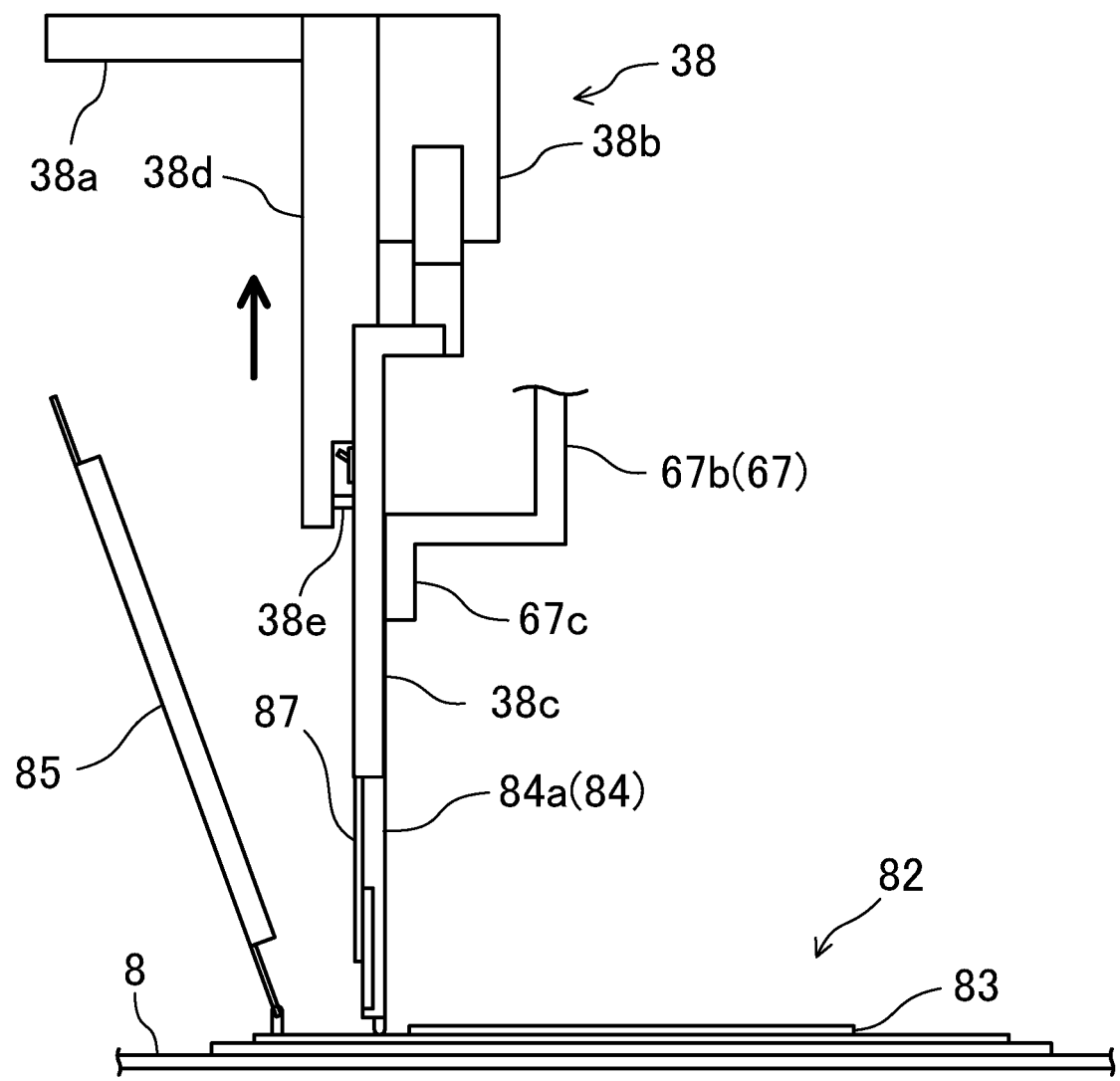
FIG. 14 is a side view of the motherboard mainly including the CPU socket in first removal operation.

In this state, the controller 7 causes the first robot arm 1 to perform first removal operation of removing the first protection cover 87 from the slot 84. During the first removal operation, the second robot arm 4 maintains the state where the slot 84 is retained in the upright state. FIG. 14 is a side view of the motherboard 8 mainly including the CPU socket 82 in the first removal operation.

In the first removal operation, the first end effector 3 uses the second extension hand 38. First, the first robot arm 1 moves the first end effector 3 such that the pin 38e of the second extension hand 38 is inserted in the through hole 87b of the first protection cover 87. At this time, as illustrated in FIG. 14, the pair of fingers 38c is relatively separated from each other such that the pair of long sides 84a and 84c of the slot 84 is disposed between the pair of fingers 38c. The pair of fingers 38c is not in contact with the pair of long sides 84a and 84c.

The first robot arm 1 lifts the first end effector 3 from this state. Accordingly, the pin 38e is engaged with the through hole 87b, and the first protection cover 87 is pulled out along the guide 84g.

In accordance with the lift of the first end effector 3, the pair of fingers 38c moves to be located above the pair of long sides 84a and 84c. At this time, the first protection cover 87 is located between the pair of fingers 38c. When the first end effector 3 is lifted to such a position, the second extension hand 38 pinches the first protection cover 87 by the pair of fingers 38c. Accordingly, in addition to the engagement between the pin 38e and the through hole 87b, the second extension hand 38 also retains the first protection cover 87 by pinching by the pair of fingers 38c.

The first robot arm 1 further lifts the first end effector 3 from this state. Finally, the first protection cover 87 is pulled out of the slot 84. The first removal operation is an example of removal operation.

In the first removal operation, the slot 84 is retained by the second robot arm 4. Thus, while the first protection cover 87 slides along the guide 84g, the slot 84 remains at the same position. In this manner, the first protection cover 87 can be smoothly pulled out, that is, detached.

Figure 15:
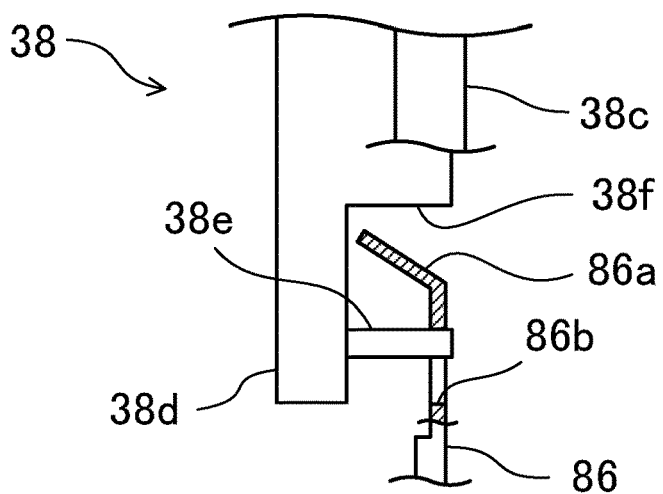
FIG. 15 is a partial cross-sectional view mainly including a pin of the second extension hand in installation operation.
Figure 16:
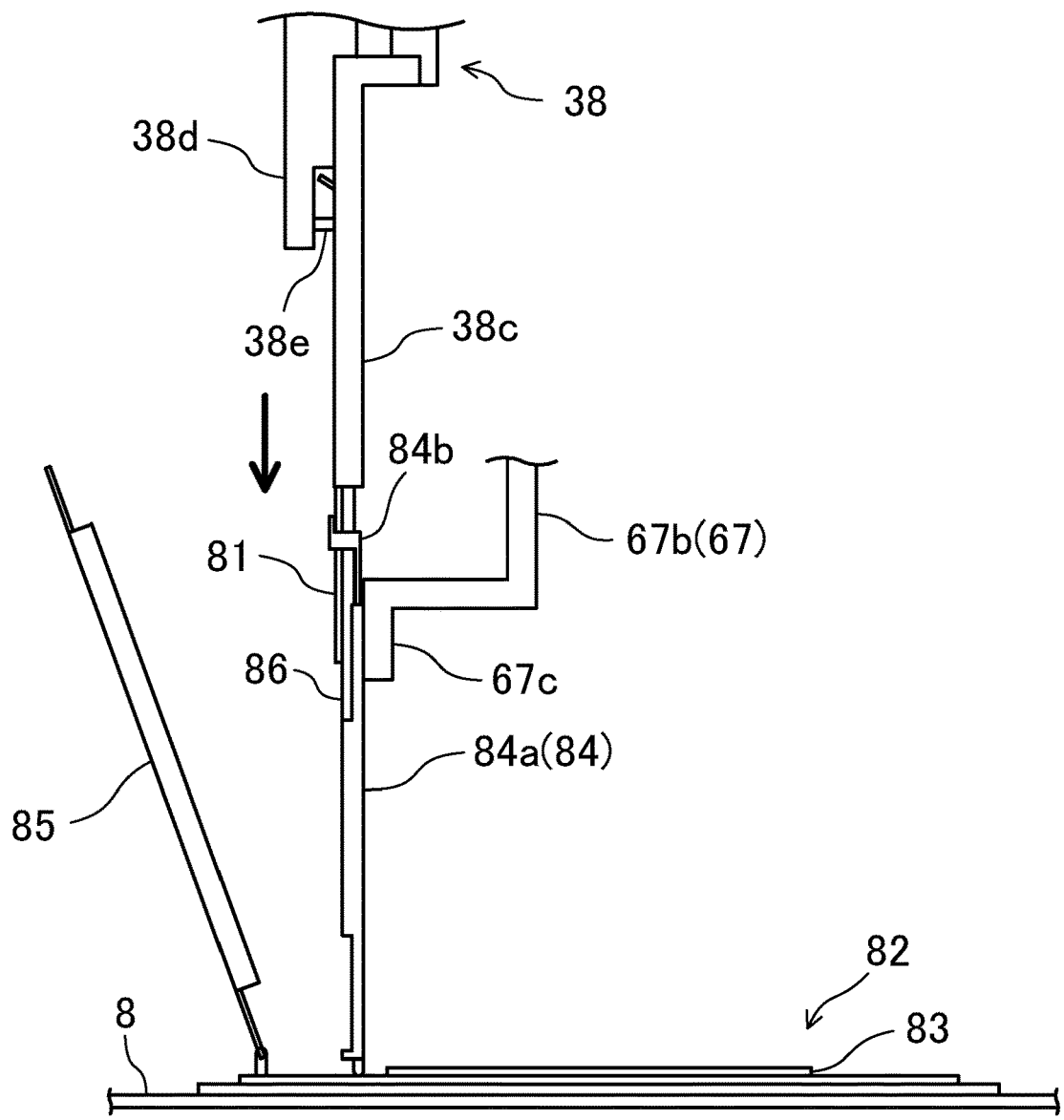
FIG. 16 is a side view of the motherboard mainly including the CPU socket in installation operation.

After the first protection cover 87 is removed, the controller 7 causes the first robot arm 1 to perform installation operation of installing the CPU 81 in the slot 84. During the installation operation, the second robot arm 4 maintains the slot 84 retained in the upright state. FIG. 15 is a side view of the motherboard 8 mainly including the CPU socket 82 in the installation operation. FIG. 16 is a partial cross-sectional view mainly including the pin 38e of the second extension hand 38 in the installation operation. This installation operation corresponds to the step of installing an electronic component by the first robot arm in the slot retained by the retainer.

In the installation operation, the first end effector 3 uses the second extension hand 38. That is, the first robot arm 1 performs installation operation by still using the second extension hand 38 subsequent to the first removal operation. The first end effector 3 takes out one CPU 81 housed in the CPU storage area 94. The first robot arm 1 moves the first end effector 3 such that the pin 38e of the second extension hand 38 is inserted in the through hole 86b of the carrier frame 86 of the CPU 81 in the CPU storage area 94 and that the carrier frame 86 is located between the pair of fingers 38c. At this time, the pair of fingers 38c is relatively separated from each other, and is not in contact with the carrier frame 86.

The first robot arm 1 lifts the first end effector 3 from this state. Accordingly, as illustrated in FIG. 15, the pin 38*e* is engaged with the through hole 86*b*, and the carrier frame 86 is lifted.

When the carrier frame 86 is slightly lifted from the CPU storage area 94, the second extension hand 38 pinches the carrier frame 86 by the pair of fingers 38*c*. Accordingly, in addition to the engagement between the pin 38*e* and the through hole 86*b*, the second extension hand 38 also retains the carrier frame 86 by pinching by the pair of fingers 38*c*.

In this state, as illustrated in FIG. 16, the first robot arm 1 moves the first end effector 3 such that the CPU 81 (specifically the carrier frame 86) is inserted into the guide 84*g* of the slot 84 from the short side 84*b*. As the first robot arm 1 lowers the first end effector 3, the carrier frame 86 slides in the guide 84*g* and enters the slot 84.

Here, if the first end effector 3 is continuously lowered, the pair of fingers 38*c* pinching the carrier frame 86 interferes with the carrier frame 86. Thus, before the pair of fingers 38*c* contacts the carrier frame 86, the second extension hand 38 causes the pair of fingers 38*c* to be separated to a position at which the pair of fingers 38*c* does not interfere with the slot 84 and cancels pinching of the carrier frame 86. At this time, as illustrated in FIG. 15, the second extension hand 38 retains the carrier frame 86 by engagement between the pin 38*e* and the through hole 86*b*.

Thereafter, the first robot arm 1 further lowers the first end effector 3. Accordingly, the entire carrier frame 86 is inserted into the slot 84 along the guide 84*g*.

After completion of the installation operation, the second robot arm 4 cancels retention of the slot 84 in the upright state. In this manner, the slot 84 rotationally moves from the upright state to the natural state.

In this installation operation, the slot 84 is retained by the second robot arm 4 in the upright state. That is, the position of the slot 84 is fixed. The CPU 81 is inserted into the guide 84*g* of the slot 84 from the short side 84*b* of the slot 84. Since the second robot arm 4 holds the slot 84, while the CPU 81 is inserted in the guide 84*g* and the CPU 81 slides along the guide 84*g*, the slot 84 remains at the same position.

As described above, in the installation operation, the first robot arm 1 installs the CPU 81 in the slot 84 retained by the second robot arm 4. Accordingly, the first robot arm 1 can accurately install the CPU 81 in the guide 84*g* and cause the CPU 81 to slide along the guide 84*g* stably. That is, the CPU 81 can be installed in the slot 84 carefully not to damage the CPU 81.

Then, the controller 7 causes the first robot arm 1 to perform falling operation of falling the slot 84.

In the falling operation, the first end effector 3 uses the first extension hand 37. The first robot arm 1 moves the first end effector 3 such that the slot 84 in the natural state rotationally moves in the direction of the fallen state by the nails 37*c* of the first extension hand 37. The slot 84 is pressed by the nails 37*c* to thereby rotationally move to the fallen state against an elastic force of the helical torsion spring.

Figure 17:
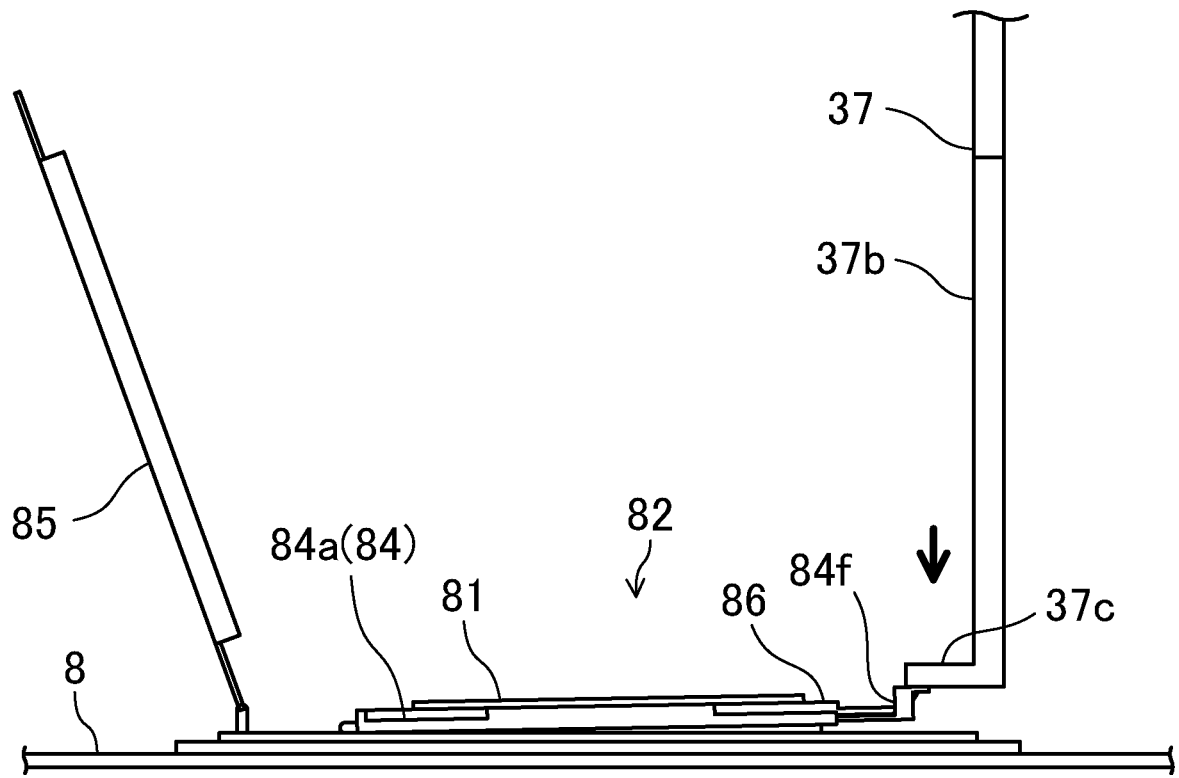
FIG. 17 is a side view of the motherboard mainly including the CPU socket in locking operation.

When the slot 84 rotationally moves to a position immediately before the fallen state, the controller 7 causes the first robot arm 1 to perform locking operation of locking the slot 84. FIG. 17 is a side view of the motherboard 8 mainly including the CPU socket 82 in the locking operation.

In the locking operation, the first end effector 3 still uses the first extension hand 37 subsequent to the falling operation. The first robot arm 1 moves the first end effector 3 such that the nails 37*c* of the first extension hand 37 are located above the projections 84*f* and 84*f*. In this state, the first robot arm 1 moves the first end effector 3 downward such that the nails 37*c* push the slot 84 from above. The streaks such as the long sides 84*a* and 84*c* of the slot 84 are elastically deformed to some degree so that the second engagements 84*h* and 84*h* of the slot 84 are thereby engaged with the first engagements 83*e* and 83*e* of the base frame 83. As a result, the slot 84 is locked in the fallen state.

Subsequently, the controller 7 causes the first robot arm 1 to perform frame closing operation of falling the fixed frame 85. In the frame closing operation, the first end effector 3 still uses the first extension hand 37 subsequent to the locking operation. The first robot arm 1 moves the first end effector 3 such that the nails 37*c* of the first extension hand 37 rotationally move the fixed frame 85 such that the fixed frame 85 in the natural state shifts to the fallen state. The fixed frame 85 is pushed by the nails 37*c* to thereby rotationally move to the fallen state against an elastic force of the helical torsion spring. When the fixed frame 85 rotates to the fallen state, the first robot arm 1 still stops and maintains the fixed frame 85 in the fallen state.

Lastly, the controller 7 causes the second robot arm 4 to perform fixing operation of screwing the fixed frame 85. In the fixing operation, the second end effector 6 uses the fourth extension hand 68. The second robot arm 4 moves the second end effector 6 such that the tip of the bit 68*c* of the fourth extension hand 68 is fitted in a groove in a screw head for fixing the fixed frame 85. When the tip of the bit 68*c* is fitted in the screw groove, the fourth extension hand 68 tightens the screw to screw the fixed frame 85. The controller 7 causes this operation to be performed a number of times equal to the number of screws for fixing the fixed frame 85. Accordingly, the fixed frame 85 is screwed to the motherboard 8.

In this manner, installation of the CPU 81 in the motherboard 8 is completed. When the installation of the CPU 81 is completed, the stopper of the belt conveyor 91 is canceled so that the tray 93 is conveyed and a next tray 93 is conveyed.

In this installation of the CPU 81, the CPU 81 is installed in the CPU socket 82 through the slot 84 rotatably coupled to the motherboard 8, and thus, the CPU 81 can be installed in the CPU socket 82 with high positioning accuracy. On the other hand, since the high positioning accuracy is achieved, installation of the CPU 81 in the slot 84 has a small margin. Specifically, there is a small margin between the CPU 81 and the guide 84*g* of the slot 84. In addition, since the slot 84 is rotatable with respect to the motherboard 8, the slot 84 is not stable. However, in the robot 100, the second robot arm 4 retains the slot 84 so that the slot 84 can be thereby maintained in a predetermined posture, that is, the position of the slot 84 can be fixed. In this state, the first robot arm 1 installs the CPU 81 in the slot 84 so that the CPU 81 can be thereby installed in the slot 84 stably without damage of the CPU 81.

In the manner described above, the robot 100 (electronic component installation device) installs the CPU 81 (electronic component) in the CPU socket 82 (socket) disposed on the motherboard 8 (board), through the slot 84 coupled to the motherboard 8 to be rotatable about the predetermined axis L. The robot 100 includes the first robot arm 1, the second robot arm 4 (retainer) that retains the slot 84 at a predetermined position, and the controller 7 that controls the first robot arm 1. The controller 7 causes the first robot arm 1 to perform installation operation of installing the CPU 81 in the slot 84. In the installation operation, the first robot arm 1 installs the CPU 81 in the slot 84 retained by the second robot arm 4.

In other words, the electronic component installation method using the robot 100 is an electronic component installation method for installing the CPU 81 (electronic component) in the CPU socket 82 (socket) on the motherboard 8 through the slot 84 coupled to the motherboard 8 to be rotatable about the predetermined axis L. The electronic component installation method includes the steps of: retaining the slot 84 at a predetermined position by the second robot arm 4 (retainer); and installing the CPU 81 by the first robot arm 1 in the slot 84 retained by the second robot arm 4.

With these configurations, the slot 84 is retained by the second robot arm 4 and, thereby, can be thereby maintained in a stable state. Since the first robot arm 1 installs the CPU 81 in the retained slot 84, the first robot arm 1 does not need to take a positional shift of the slot 84 into consideration, and the CPU 81 only needs to be installed in the fixed slot 84. As a result, the CPU 81 can be installed in the slot 84 stably.

The second robot arm 4 functions as a retainer. The controller 7 causes the second robot arm 4 to perform retention operation of retaining the slot 84.

With this configuration, the retainer is implemented by the second robot arm 4, and thus, flexibility of retention operation can be enhanced. For example, the position of the slot 84 in retaining the slot 84 by the second robot arm 4 can be flexibly changed.

In addition, the slot 84 is rotationally movable between the fallen state where the slot 84 is fallen on the motherboard 8 and installs the CPU 81 in the CPU socket 82 and the upright state where the slot 84 rises from the motherboard 8, and the second robot arm 4 retains the slot 84 in the upright state.

With this configuration, in the fallen state of the slot 84, the slot 84 approaches the CPU socket 82, and small space remains around the slot 84. On the other hand, the second robot arm 4 retains the slot 84 in the upright state so that space can be easily obtained around the slot 84. As a result, the slot 84 can be easily retained by the second robot arm 4, and the CPU 81 can be easily installed in the slot 84 by the first robot arm 1.

Before the CPU 81 is installed in the slot 84, the first protection cover 87 for protecting the CPU socket 82 is installed in the slot 84. The controller 7 causes the first robot arm 1 to perform first removal operation (removal operation) of removing the first protection cover 87 from the slot 84 before the installation operation.

With this configuration, it is necessary to remove the first protection cover 87 from the slot 84 before installation of the CPU 81. In view of this, the first robot arm 1 removes the first protection cover 87 from the slot 84.

In addition, in the first removal operation, the second robot arm 4 retains the slot 84.

With this configuration, in the first removal operation, the slot 84 can be stably maintained by retaining the slot 84 by the second robot arm 4. Since the first robot arm 1 detaches the first protection cover 87 from the retained slot 84, the first robot arm 1 does not need to take variations of the slot 84 into consideration, and only needs to detach the first protection cover 87 from the fixed slot 84. As a result, the first protection cover 87 can be stably detached from the slot 84.

Second Embodiment

Next, a dual-arm robot 100 according to a second embodiment will be described. A basic configuration of the dual-arm robot 100 according to the second embodiment is the same as that of the first embodiment. Operation contents of the dual-arm robot 100 according to the second embodiment are mainly different from those of the first embodiment. Components of the dual-arm robot 100 according to the second embodiment similar to those of the first embodiment are denoted by the same reference characters and will not be described again.

Figure 18:
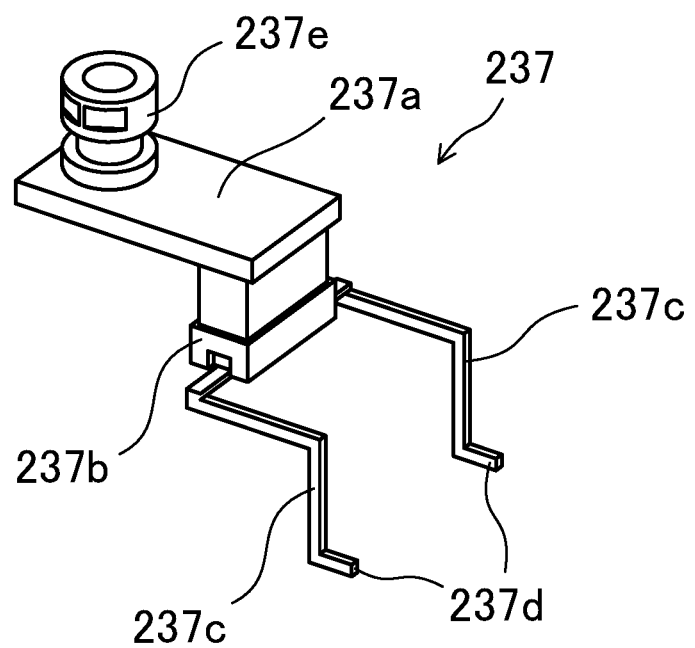
FIG. 18 is a perspective view of a fifth extension hand.
Figure 19:
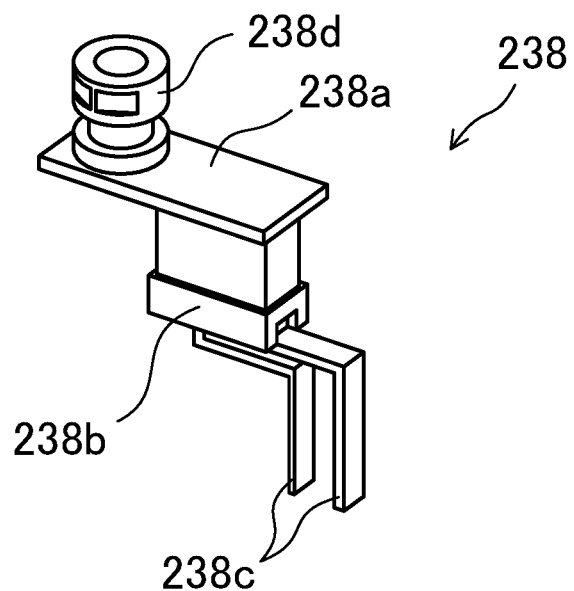
FIG. 19 is a perspective view of a sixth extension hand.

A first end effector 3 selectively holds a fifth extension hand 237 and a sixth extension hand 238. FIG. 18 is a perspective view of the fifth extension hand 237. FIG. 19 is a perspective view of the sixth extension hand 238.

The fifth extension hand 237 is a single-chuck hand. The fifth extension hand 237 includes a base 237a, a guide 237b disposed in the base 237a, a pair of fingers 237c supported by the guide 237b, an actuator that drives the pair of fingers 237c, and a cylindrical grip 237e disposed in the base 237a.

The pair of fingers 237c is disposed side by side in the lateral direction and extends substantially in the top-bottom direction. The distal end of each finger 237c has a nail 237d extending in the front-rear direction. The pair of fingers 237c is supported by the guide 237b such that the pair of fingers 237c is separated from each other or approaches each other in the lateral direction. The actuator is, for example, an air cylinder. The actuator is connected to an air compressor (not shown) through a pipe and an electromagnetic valve (not shown). The direction in which the actuator moves the pair of fingers 237c is switched by the electromagnetic valve. That is, the electromagnetic valve switches the direction of the pair of fingers 237c between the direction in which the pair of fingers 237c is separated from each other and the direction in which the pair of fingers 237c approaches each other. The first hand 31 holds the grip 237e.

The sixth extension hand 238 is a single-chuck hand. The sixth extension hand 238 includes a base 238a, a guide 238b disposed in the base 238a, a pair of fingers 238c supported by the guide 238b, an actuator that drives the pair of fingers 238c, and a cylindrical grip 238d disposed in the base 238a.

The pair of fingers 238c is disposed side by side in the lateral direction and extends substantially in the top-bottom direction. The pair of fingers 238c is supported by the guide 238b such that the pair of fingers 238c is separated from each other or approaches each other in the front-rear direction. The sixth extension hand 238 includes an actuator that drives the pair of fingers 238c. The actuator is, for example, an air cylinder. The actuator is connected to an air compressor (not shown) through a pipe and an electromagnetic valve (not shown). The direction in which the actuator moves the pair of fingers 238c is switched by the electromagnetic valve. That is, the electromagnetic valve switches the direction of the pair of fingers 238c between the direction in which the pair of fingers 238c is separated from each other and the direction in which the pair of fingers 238c approaches each other. The first hand 31 holds the grip 238d.

Figure 20:
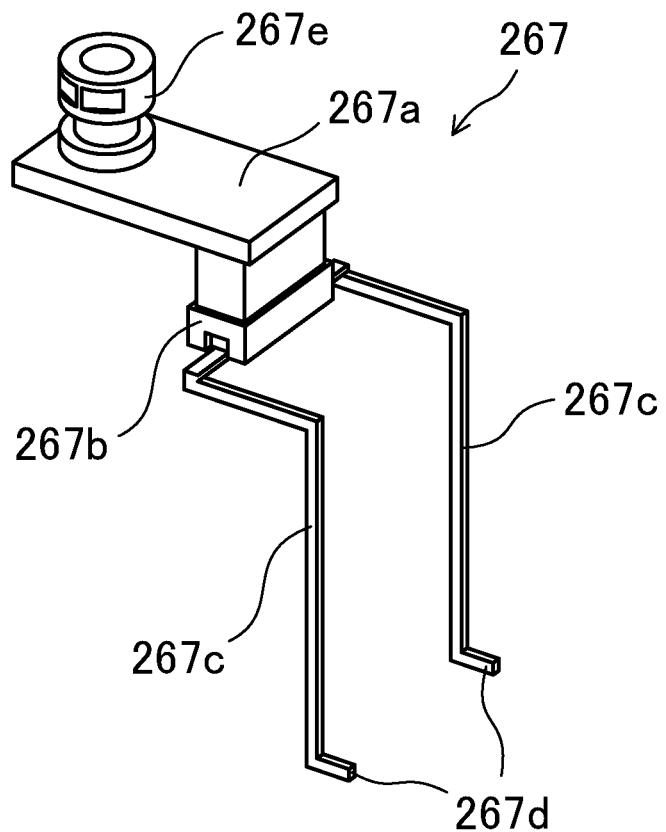
FIG. 20 is a perspective view of a seventh extension hand.

A second end effector 6 selectively holds a seventh extension hand 267 and a fourth extension hand 68. FIG. 20 is a perspective view of the seventh extension hand 267.

The seventh extension hand 267 is a single-chuck hand. The seventh extension hand 267 includes a base 267a, a guide 267b disposed in the base 267a, a pair of fingers 267c supported by the guide 267b, an actuator that drives the pair of fingers 267c, and a cylindrical grip 267e disposed in the base 267a.

The pair of fingers 267c is disposed side by side in the lateral direction and extends substantially in the top-bottom direction. The distal end of each finger 267c has a nail 267d extending in the front-rear direction. The pair of fingers 267c is supported by the guide 267b such that the pair of fingers 267c is separated from each other or approaches each other in the lateral direction. The seventh extension hand 267 includes an actuator that drives the pair of fingers 267c. The actuator is, for example, an air cylinder. The actuator is connected to an air compressor (not shown) through a pipe and an electromagnetic valve (not shown). The direction in which the actuator moves the pair of fingers 267c is switched by the electromagnetic valve. That is, the electromagnetic valve switches the direction of the pair of fingers 267c between the direction in which the pair of fingers 267c is separated from each other and the direction in which the pair of fingers 267c approaches each other. The second hand 61 holds the grip 267e.

A configuration of a controller 7 according to the second embodiment is similar to that of the first embodiment. It should be noted that a basic program and information such as various types of data stored in a memory 72 correspond to operation of the second embodiment. An arithmetic operator 71 outputs a control signal to, for example, an electromagnetic valve of the fifth extension hand 237 in addition to electromagnetic valves 34 and 64 and other components.

Next, installation of a CPU 81 by the robot 100 according to the second embodiment will be described. The robot 100 installs the CPU 81 on the motherboard 8 conveyed on the tray 93.

At the time when the motherboard 8 is conveyed to the robot 100, the second protection cover 88 has been attached to the CPU socket 82 (see, for example, FIGS. 22 and 23), and the first protection cover 87 has been installed in the slot 84. The second protection cover 88 is placed on the base frame 83. The second protection cover 88 placed on the base frame 83 is covered with the first protection cover 87 installed in the slot 84. The first protection cover 87 and the second protection cover 88 are disposed to protect the CPU socket 82. One of the first protection cover 87 or the second protection cover 88 may be omitted.

First, the controller 7 causes the second robot arm 4 to perform fixture releasing operation of releasing screw fixture of the fixed frame 85. This fixture releasing operation is similar to the fixture releasing operation of the first embodiment. The second end effector 6 removes screws of the fixed frame 85 by using the fourth extension hand 68.

After the fixture releasing operation, in a case where the fixed frame 85 does not rise naturally to the upright state by an elastic force of a helical torsion spring or a case where no helical torsion spring is disposed in the fixed frame 85, the controller 7 causes the first robot arm 1 to perform frame opening operation of raising the fixed frame 85. In the frame opening operation, the first end effector 3 uses the first extension hand 37. The first robot arm 1 hangs front ends of the nails 237d and 237d of the pair of fingers 237c of the fifth extension hand 237 on the fixed frame 85 so that the fixed frame 85 rises to the upright state.

Thereafter, the controller 7 causes the first robot arm 1 to perform unlocking operation of unlocking the slot 84 in the fallen state.

In the unlocking operation, the first end effector 3 uses the fifth extension hand 237. The first robot arm 1 moves the first end effector 3 such that the nails 237d and 237d of the pair of fingers 237c of the fifth extension hand 237 are located below two projections 84f and 84f of the slot 84 in the fallen state. The first robot arm 1 lifts the fifth extension hand 237. Accordingly, the nails 237d and 237d push the projections 84f and 84f upward. The streaks such as the long sides 84a and 84c of the slot 84 are elastically deformed to some degree so that the second engagements 84h and 84h of the slot 84 are separated from the first engagements 83e and 83e of the base frame 83. In this manner, the slot 84 is unlocked. This unlocking operation is an example of releasing operation.

Figure 21:
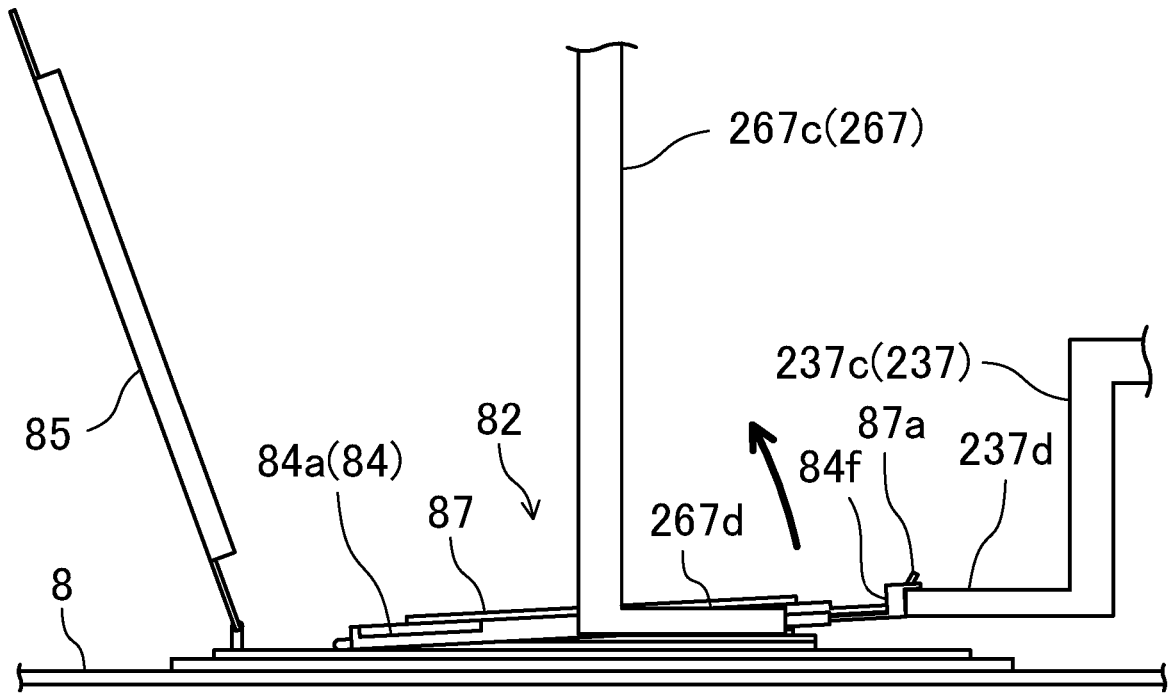
FIG. 21 is a side view of the motherboard mainly including the CPU socket after unlocking operation is completed.

After the unlocking operation, if the slot 84 does not rise naturally to the natural state by an elastic force of the helical torsion spring or a case where no helical torsion spring is disposed in the slot 84, the controller 7 causes the second robot arm 4 to perform raising operation of raising the slot 84. FIG. 21 is a side view of the motherboard 8 mainly including the CPU socket 82 after completion of the unlocking operation. The side view of the motherboard 8 used in description of the first embodiment is a side view of the motherboard 8 seen from the side facing the robot 100.

In the raising operation, the second end effector 6 uses the seventh extension hand 267. The second robot arm 4 moves the second end effector 6 such that the pair of long sides 84a and 84c of the slot 84 is located between the nails 267d and 267d of the pair of fingers 267c of the seventh extension hand 267. The seventh extension hand 267 causes the nails 267d and 267d to hold the outer side of the pair of long sides 84a and 84c. With the pair of long sides 84a and 84c held by the seventh extension hand 267, the second robot arm 4 moves the second end effector 6 such that the slot 84 rises. At start of the raising operation, the first robot arm 1 maintains a state where the two projections 84f and 84f are pushed upward by the fifth extension hand 237.

The movement of the second end effector 6 to a position at which the seventh extension hand 267 can hold the slot 84 may be performed during the unlocking operation of the first robot arm 1. In this case, immediately after the slot 84 is unlocked, the second robot arm 4 can perform the raising operation.

Figure 22:
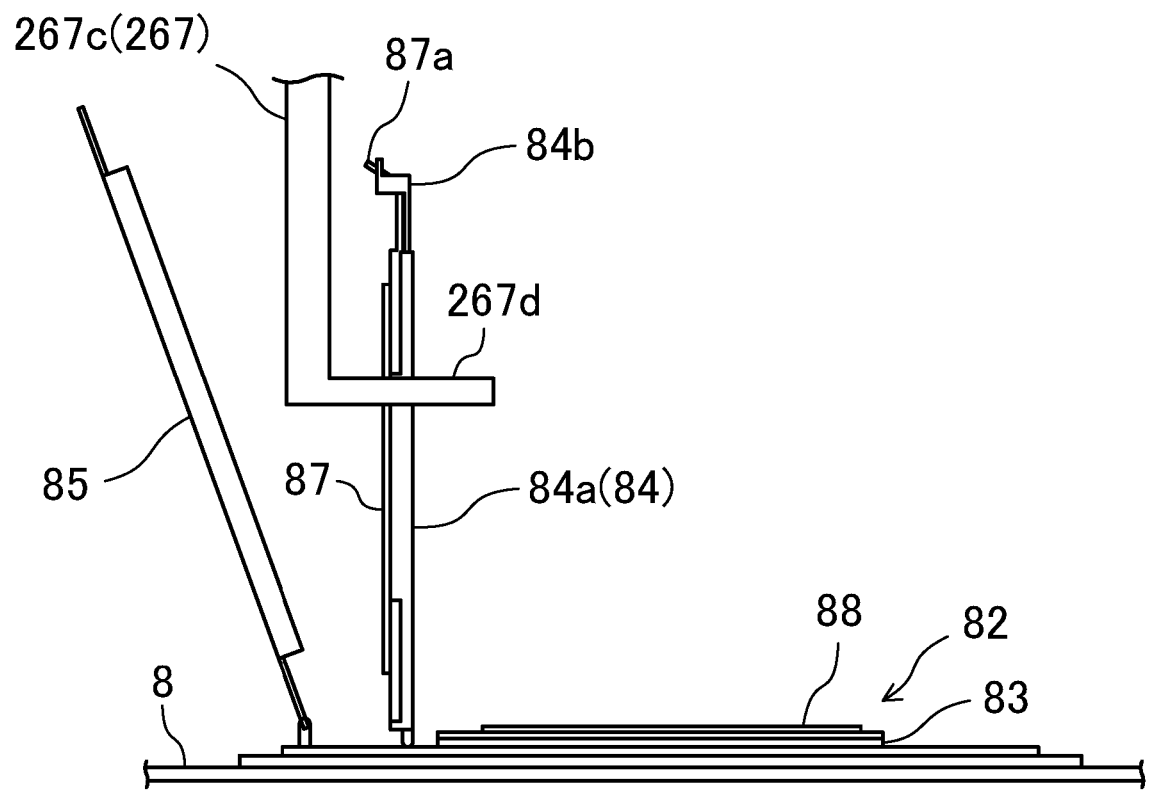
FIG. 22 is a side view of the motherboard mainly including the CPU socket in retention operation.

Once the raising operation is completed, the controller 7 causes the second robot arm 4 to perform retention operation of retaining the slot 84 in the upright state. FIG. 22 is a side view of the motherboard 8 mainly including the CPU socket 82 in the retention operation.

In the retention operation, the second robot arm 4 retains the slot 84 in the upright state by the seventh extension hand 267. Specifically, the seventh extension hand 267 causes the nails 267d and 267d to hold the outer sides of the pair of long sides 84a and 84c. This is the state where the second robot arm 4 completes the raising operation. That is, the controller 7 maintains the state where the second robot arm 4 has completed the raising operation. Accordingly, the upright state of the slot 84 is maintained. This retention operation corresponds to the step of retaining the slot at a predetermined position by the retainer.

Figure 23:
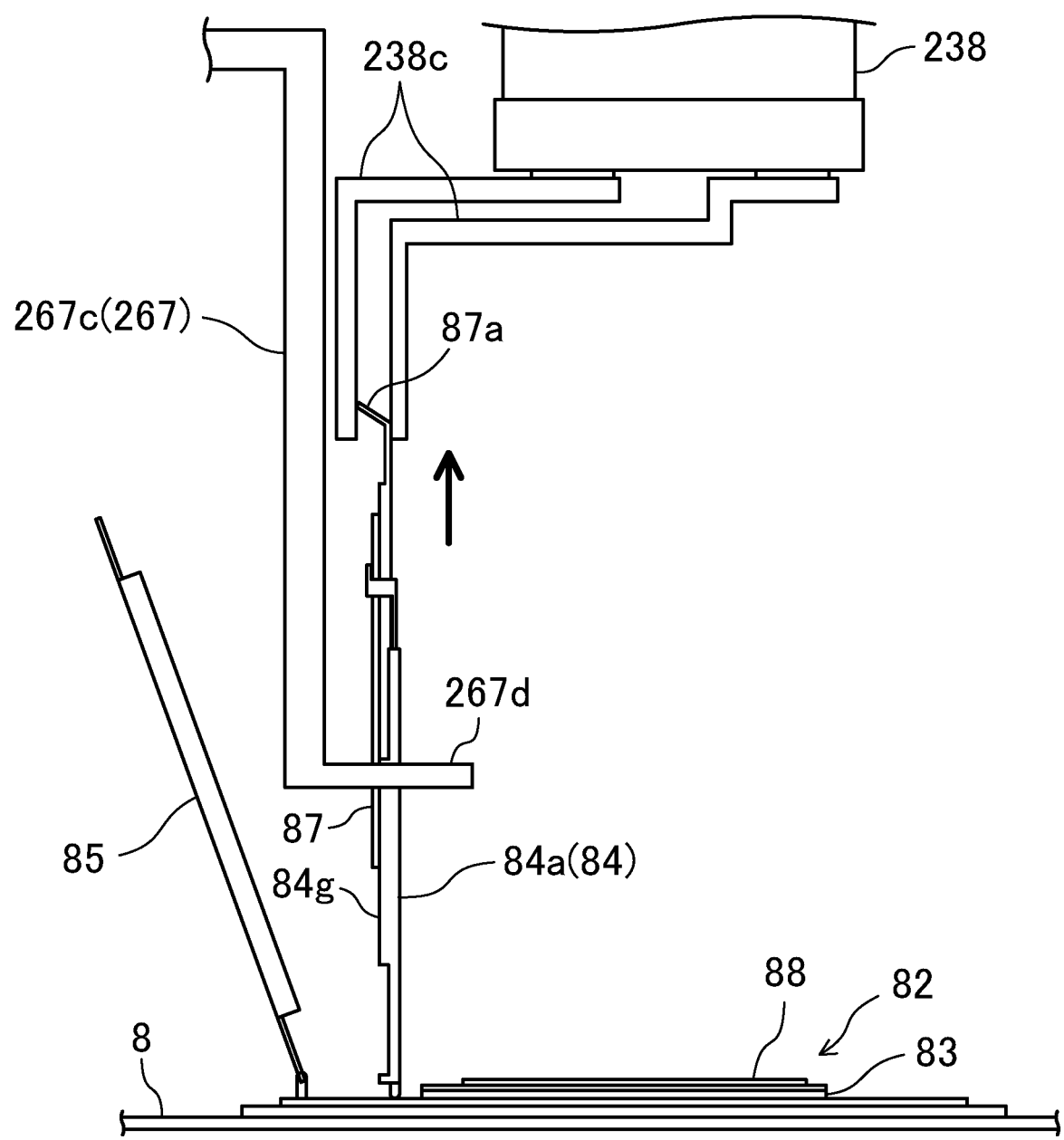
FIG. 23 is a side view of the motherboard mainly including the CPU socket in first removal operation.

In this state, the controller 7 causes the first robot arm 1 to perform first removal operation of removing the first protection cover 87 from the slot 84. FIG. 23 is a side view of the motherboard 8 mainly including the CPU socket 82 in the first removal operation.

In the first removal operation, the first end effector 3 uses the sixth extension hand 238. The first robot arm 1 moves the first end effector 3 such that the projection 87a of the first protection cover 87 is located between the pair of fingers 238c of the sixth extension hand 238. The sixth extension hand 238 holds the projection 87a with the pair of fingers 238c. In this state, as illustrated in FIG. 23, the first robot arm 1 moves the first end effector 3 in a direction in which the first protection cover 87 is pulled out along the guide 84g. Accordingly, the first protection cover 87 is removed from the slot 84. The first removal operation is an example of removal operation.

In the first removal operation, the slot 84 is retained by the second robot arm 4. Thus, while the first protection cover 87 slides along the guide 84g, the slot 84 remains at the same position. Accordingly, the first protection cover 87 can be smoothly pulled out, that is, detached.

Figure 24:
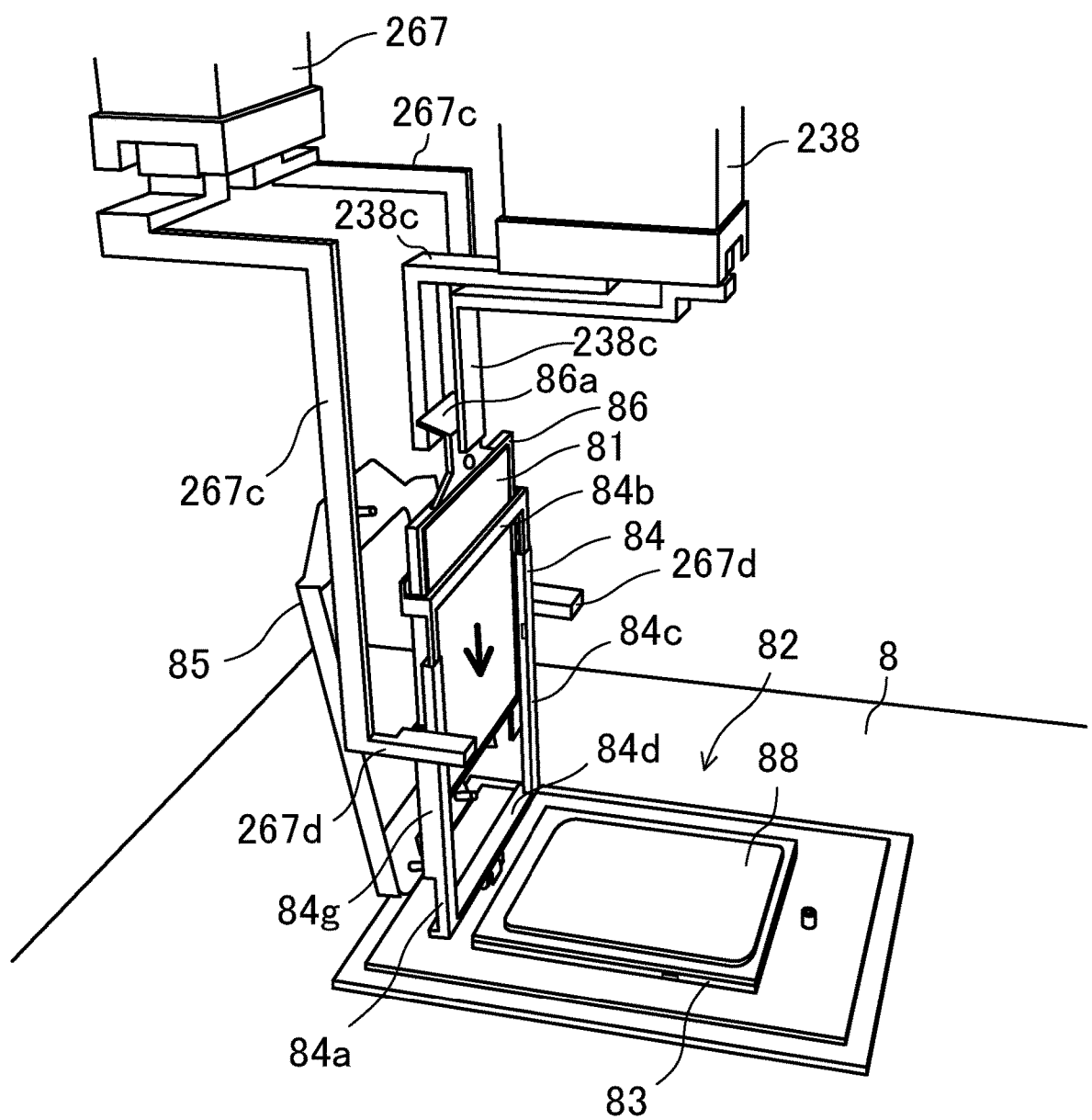
FIG. 24 is a perspective view of the motherboard mainly including the CPU socket in installation operation.

When the first protection cover 87 is removed, the controller 7 causes the first robot arm 1 to perform installation operation of installing the CPU 81 in the slot 84. FIG. 24 is a perspective view of the motherboard 8 mainly including the CPU socket 82 in the installation operation.

In the installation operation, the first end effector 3 uses the sixth extension hand 238 subsequent to the first removal operation. The first end effector 3 takes out one CPU 81 housed in the CPU storage area 94. The first robot arm 1 moves the first end effector 3 such that the projection 86a of the carrier frame 86 of one CPU 81 in the CPU storage area 94 is located between the pair of fingers 238c of the sixth extension hand 238. The sixth extension hand 238 holds the projection 86a with the pair of fingers 238c. In this state, as illustrated in FIG. 24, the first robot arm 1 moves the first end effector 3 such that the CPU 81 (specifically the carrier frame 86) is inserted into the guide 84g of the slot 84. This installation operation corresponds to the step of installing, by the first robot arm, an electronic component in the slot retained by the retainer.

Specifically, the slot 84 is retained by the second robot arm 4 in the upright state. That is, the position of the slot 84 is fixed. The CPU 81 is inserted in the guide 84g of the slot 84 from the short side 84b of the slot 84. Since the second robot arm 4 retains the slot 84, while the CPU 81 slides along the guide 84g, the slot 84 remains at the same position.

In the manner described above, in the installation operation, the first robot arm 1 installs the CPU 81 in the slot 84 retained by the second robot arm 4. Accordingly, the CPU 81 can be inserted in the slot 84 carefully not to damage the CPU 81.

When installation of the CPU 81 is completed, the controller 7 causes the first robot arm 1 to perform second removal operation of removing the second protection cover 88. In the second removal operation, the first end effector 3 uses the fifth extension hand 237. The first robot arm 1 moves the first end effector 3 such that the second protection cover 88 is located between the nails 237d and 237d of the pair of fingers 237c of the fifth extension hand 237. The fifth extension hand 237 holds the second protection cover 88 with the nails 237d and 237d. In this state, the first robot arm 1 moves the first end effector 3 to remove the second protection cover 88. Accordingly, the second protection cover 88 is removed.

Then, the controller 7 causes the second robot arm 4 to perform falling operation of falling the slot 84.

In the falling operation, the second end effector 6 uses the seventh extension hand 267. The second robot arm 4 continues retention of the slot 84 until this time. From this state, the second robot arm 4 moves the second end effector 6 such that the slot 84 is fallen. The second robot arm 4 falls the slot 84 to a state immediately before the slot 84 is locked, that is, immediately before the slot 84 becomes the fallen state.

When the slot 84 reaches the state immediately before the fallen state, the controller 7 causes the first robot arm 1 to perform locking operation of locking the slot 84.

In the locking operation, the first end effector 3 uses the fifth extension hand 237. The first robot arm 1 moves the first end effector 3 such that the nails 237d and 237d of the pair of fingers 237c of the fifth extension hand 237 are located above the slot 84. Specifically, the nails 237d and 237d of the fifth extension hand 237 are moved to be located above the projections 84f and 84f of the slot 84. In this state, the first robot arm 1 moves the first end effector 3 downward such that the nails 237d and 237d of the fifth extension hand 237 push the slot 84 from above. The streaks such as the long sides 84a and 84c of the slot 84 are elastically deformed to some degree so that the second engagements 84h and 84h of the slot 84 are thereby engaged with the first engagements 83e and 83e of the base frame 83. As a result, the slot 84 is locked in the fallen state.

Subsequently, the controller 7 causes the first robot arm 1 to perform frame closing operation of falling the fixed frame 85. In the frame closing operation, the first end effector 3 uses the fifth extension hand 237 subsequent to the locking operation. The first robot arm 1 moves the first end effector 3 such that the nails 237d and 237d of the pair of fingers 237c of the fifth extension hand 237 contact the fixed frame 85 (specifically a portion serving as an upper surface in the fallen state). The first robot arm 1 moves the first end effector 3 from this state such that the nails 237d and 237d of the fifth extension hand 237 push the fixed frame 85 in the direction in which the fixed frame 85 becomes the fallen state.

Lastly, the controller 7 causes the second robot arm 4 to perform fixing operation of screwing the fixed frame 85. In the fixing operation, the second end effector 6 uses the fourth extension hand 68. The second robot arm 4 moves the second end effector 6 such that the tip of the bit 68c of the fourth extension hand 68 is fitted in a groove in a screw head for fixing the fixed frame 85. At this time, after frame closing operation, the first robot arm 1 holds down the fixed frame 85 by the fifth extension hand 237. When the tip of the bit 68c is fitted in the screw groove, the fourth extension hand 68 tightens the screw to screw the fixed frame 85. The controller 7 causes this operation to be performed a number of times equal to the number of screws fixing the fixed frame 85. Accordingly, the fixed frame 85 is screwed to the motherboard 8.

In this manner, installation of the CPU 81 in the motherboard 8 is completed.

In this installation of the CPU 81, the CPU 81 is installed in the CPU socket 82 through the slot 84 rotatably coupled to the motherboard 8, and thus, the CPU 81 can be installed in the CPU socket 82 with high positioning accuracy. In addition, in the robot 100, the slot 84 is retained by the second robot arm 4 so that the slot 84 can be thereby maintained in a predetermined posture, that is, the position of the slot 84 can be fixed. In this state, the CPU 81 is installed in the slot 84 by the first robot arm 1 so that the CPU 81 can be thereby installed in the slot 84 stably without damage of the CPU 81.

In the manner described above, the robot 100 according to the second embodiment has advantages similar to those of the first embodiment.

In addition, before installation operation, the controller 7 causes the second robot arm 4 to perform raising operation of raising the slot 84 from the fallen state to the upright state.

With this configuration, in a case where the slot 84 is in the fallen state in installing the CPU 81, the slot 84 needs to be raised to the upright state before the installation operation. At this time, the controller 7 causes the second robot arm 4 to perform raising operation. The second robot arm 4 performs retention operation of the slot 84 in installation operation, and thus, after the raising operation, the second robot arm 4 can shift to retention operation without change.

The slot 84 is configured to be locked to the motherboard 8 in the fallen state, and the controller 7 causes the first robot arm 1 to perform releasing operation of unlocking the slot 84 in the fallen state before installation operation.

With this configuration, in a case where the slot 84 is locked in the fallen state, the first robot arm 1 unlocks the slot 84. After unlocking, raising operation is performed by the second robot arm 4. By causing the first robot arm 1 to perform releasing operation, the second robot arm 4 is prepared for the raising operation. As a result, after releasing operation by the first robot arm 1, operation can smoothly shift to the raising operation by the second robot arm 4.

Other Embodiments

In the foregoing description, the embodiments have been described as an example of the technique disclosed in the present application. The technique disclosed here, however, is not limited to these embodiments, and is applicable to other embodiments obtained by changes, replacements, additions, and/or omissions as necessary. Components described in the above embodiments may be combined as a new exemplary embodiment. Components included in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

For example, the electronic component is not limited to the CPU 81. The electronic component may be, for example, an IC device, and more specifically, may be a large scale integration (LSI) circuit.

The socket is not limited to the CPU socket 82. The socket may be, for example, an IC socket.

The retainer for retaining the slot 84 is not limited to the second robot arm 4. For example, a dedicated device for retaining the slot 84 may be disposed as a retainer.

The position of the slot 84 retained by the second robot arm 4, that is, the retainer, may be set at any position as long as the slot 84 rises from the motherboard 8 relative to the fallen state at this position.

As long as the second robot arm 4 performs retention operation of the slot 84 and the first robot arm 1 performs installation operation of the CPU 81, other operations may be performed by any one of the first robot arm 1 or the second robot arm 4 within a possible range.

The technique disclosed here is not limited to the configuration in which one dual-arm robot 100 includes the first robot arm 1 and the second robot arm 4. For example, the first robot arm 1 may be disposed in one robot with the second robot arm 4 being disposed in another robot. That is, two robots may achieve the operations described above.

DESCRIPTION OF REFERENCE CHARACTERS 100 dual-arm robot
1 first robot arm
4 second robot arm (retainer)
8 motherboard (board)
81 CPU (electronic component)
82 CPU socket (socket)
84 slot
87 first protection cover (protection cover)
L axis

The invention claimed is:

1. An electronic component installation device comprising:
   a first robot arm configured to perform an installation operation of an electronic component in a socket through a slot, the socket being disposed on a board, and the slot being coupled to the board to be rotatable about a predetermined axis;
   a retainer that retains the slot at a predetermined rotation position relative to the board; and
   a controller that controls the first robot arm, wherein the controller causes the first robot arm to perform the installation operation of installing the electronic component in the slot retained by the retainer at the predetermined rotation position.

2. The electronic component installation device according to claim 1, wherein
   the retainer is a second robot arm, and
   the controller causes the second robot arm to perform a retention operation of retaining the slot at the predetermined rotation position.

3. The electronic component installation device according to claim 2, wherein
   the slot is rotationally movable between a fallen state where the slot is fallen on the board and an upright state where the slot rises from the board and allows the electronic component to be installed in the socket, and
   the second robot arm retains the slot in the upright state.

4. The electronic component installation device according to claim 3, wherein
   the controller causes the second robot arm to perform a raising operation of raising the slot from the fallen state to the upright state before the installation operation.

5. The electronic component installation device according to claim 4, wherein
   the slot is configured to be locked to the board in the fallen state, and
   the controller causes the first robot arm to perform a releasing operation of unlocking the slot in the fallen state before the installation operation.

6. The electronic component installation device according to claim 1, wherein
   a protection cover that protects the socket is installed in the slot before the electronic component is installed, and
   the controller causes the first robot arm to perform a removal operation of removing the protection cover from the slot before the installation operation.

7. The electronic component installation device according to claim 6, wherein
   in the removal operation, the retainer retains the slot at the predetermined rotation position.

8. An electronic component installation method for installing an electronic component in a socket through a slot, the socket being disposed on a board, the slot being coupled to the board to be rotatable about a predetermined axis, the electronic component installation method comprising the steps of:
   retaining the slot at a predetermined rotation position relative to the board by a retainer of an electronic component installation device; and
   installing the electronic component by a first robot arm of the electronic component installation device in the slot retained by the retainer at the predetermined rotation position relative to the board.

* * * * *